United States Patent
Kim et al.

(10) Patent No.: US 12,453,728 B1
(45) Date of Patent: Oct. 28, 2025

(54) COMPOSITIONS COMPRISING INHIBITORS OF MICROSOMAL TRIGLYCERIDE TRANSFER PROTEIN AND Apo-B SECRETION

(71) Applicant: Redux Therapeutics, LLC, Marblehead, MA (US)

(72) Inventors: Enoch Kim, Marblehead, MA (US); Paul Sweetnam, Marblehead, MA (US)

(73) Assignee: Redux Therapeutics, LLC, Marblehead, MA (US)

( * ) Notice: Subject to any disclaimer, the term of this patent is extended or adjusted under 35 U.S.C. 154(b) by 0 days.

(21) Appl. No.: 19/020,126

(22) Filed: Jan. 14, 2025

Related U.S. Application Data

(63) Continuation-in-part of application No. 18/798,201, filed on Aug. 8, 2024, now abandoned.

(51) Int. Cl.
  *A61K 31/47* (2006.01)
  *A61K 9/00* (2006.01)
  *A61K 31/166* (2006.01)
  *C07D 217/06* (2006.01)

(52) U.S. Cl.
  CPC ............ *A61K 31/47* (2013.01); *A61K 9/0053* (2013.01); *C07D 217/06* (2013.01)

(58) Field of Classification Search
  None
  See application file for complete search history.

(56) References Cited

U.S. PATENT DOCUMENTS

| | | | |
|---|---|---|---|
| 5,198,462 | A | 3/1993 | Natsugari et al. |
| 5,919,795 | A | 7/1999 | Chang et al. |
| 6,121,283 | A | 9/2000 | Chang et al. |
| 6,878,707 | B2 | 4/2005 | Ksander |
| 8,980,915 | B2 | 3/2015 | Bartolozzi et al. |
| 2004/0044008 | A1 | 3/2004 | Daugan et al. |
| 2008/0249130 | A1 | 10/2008 | Vu |
| 2008/0293801 | A1 | 11/2008 | Friesen et al. |
| 2012/0093922 | A1 | 4/2012 | Manku et al. |
| 2016/0287712 | A1 | 10/2016 | Jirousek et al. |
| 2023/0321073 | A1 | 10/2023 | Sweetnam et al. |

FOREIGN PATENT DOCUMENTS

| | | |
|---|---|---|
| EP | 1099442 A2 | 5/2001 |
| WO | 03045921 A1 | 6/2003 |

OTHER PUBLICATIONS

Chistyakov, et al., "The polymorphism of drugs: new approaches to the synthesis of nanostructured polymorphs", Pharmaceutics 12(1):34, doi: 10.3390/pharmaceutics12010034, Jan. 1, 2020, 9 pgs.
Cruz-Cabeza, et al., "Facts and fictions about polymorphism", Chem Soc Rev, 44(23), https://doi.org/10.1039/C5CS00227C, 2015, 8619-8635.
Kim, et al., "A Small-Molecule Inhibitor of Enterocytic Microsomal Triglyceride Transfer Protein, SLx-4090: Biochemical, Pharmacodynamic, Pharmacokinetic, and Safety Profile", J Pharmacol & Exp Thera., 337(3), DOI: 10.1124/jpet. 110.177527, Mar. 15, 2011, 775-785.

*Primary Examiner* — Bethany P Barham
*Assistant Examiner* — Peter Anthopolos
(74) *Attorney, Agent, or Firm* — Elmore Patent Law Group, P.C.; Joseph C. Zucchero; Carolyn S. Elmore

(57) ABSTRACT

The present invention relates to pharmaceutical composition(s) comprising particles comprising one or more compounds which are inhibitors of microsomal triglyceride transfer protein and/or apolipoprotein B (Apo B) secretion, wherein at least 50% of the particles are characterized by a volume particle fraction less than 10 µm, more preferably less than 5 µm, more preferably less than 2.5 µm. The pharmaceutical composition can be useful for the prevention and treatment of various diseases, particularly atherosclerosis and its clinical sequelae, for lowering serum lipids, and related ailments. The invention further relates to methods of treating diseases, such as hypertriglyceridemia, hyperchylomicronemia, atherosclerosis, obesity, and related conditions using the compounds. A method for decreasing apolipoprotein B (apo B) secretion is also provided.

18 Claims, 8 Drawing Sheets

COMPOSITIONS COMPRISING INHIBITORS OF MICROSOMAL TRIGLYCERIDE TRANSFER PROTEIN AND Apo-B SECRETION

RELATED APPLICATION

This application is a continuation-in-part of U.S. patent application Ser. No. 18/798,201, filed on Aug. 8, 2024, the entire teachings of which are incorporated herein by reference.

FIELD OF THE INVENTION

The present invention relates to pharmaceutical composition(s) comprising particles comprising one or more compounds which are inhibitors of microsomal triglyceride transfer protein and/or apolipoprotein B (Apo B) secretion. These pharmaceutical compositions can be useful for the prevention and treatment of various diseases, particularly atherosclerosis and its clinical sequelae, for lowering serum lipids, and related ailments. The invention further relates to methods of treating diseases, such as hypertriglyceridemia, hyperchylomicronemia, atherosclerosis, obesity, and related conditions using the compounds. A method for decreasing apolipoprotein B (apo B) secretion is also provided.

BACKGROUND OF THE INVENTION

Microsomal triglyceride transfer protein (MTP) catalyzes the transport of triglyceride, cholesteryl ester, and phospholipids. MTP has been identified as an agent that may be involved in the assembly of Apo B-containing lipoproteins and biomolecules that contribute to the formation of atherosclerotic lesions. Compounds that can inhibit MTP and/or inhibit Apo B secretion can be useful in the treatment of atherosclerosis and related diseases (see, e.g., U.S. Pat. No. 5,919,795, incorporated herein by reference). These compounds can also be useful in treating diseases or conditions in which, by inhibiting MTP and/or Apo B secretion, serum cholesterol and triglyceride levels are reduced. Examples of these diseases or conditions include hypertriglyceridemia, hypercholesterolemia, pancreatitis, and obesity; and hyperchylomicronemia and hyperlipidemia associated with pancreatitis, obesity, and diabetes.

Therefore, there is a need for compounds that inhibit MTP that are effective in treating diseases or conditions, such as atherosclerosis and related diseases, and/or can provide an effective lowering of serum apo B in mammals or humans.

SUMMARY OF THE INVENTION

Technical Problem

Compounds represented by Formula 1 as described herein are Biopharmaceutical Classification System IV molecules characterized by low solubility and low permeability, and they have high tendency to cluster and aggregate when synthesized. Additional processing of solid molecules is essential to generate the pharmaceutically active ingredient (API) for manufacturing of drug products that can provide optimal efficacy and safety profile.

Thus, the present invention provides compounds represented by Formula 1 and pharmaceutical compositions thereof having an enhanced therapeutic effect in terms of efficacy and safety.

Means to Solve the Problem

The compound of Formula 1 when synthesized in bulk has demonstrated suboptimal physicochemical properties due to variable, uncontrolled size of drug substance particles.

In this connection, the inventors created particles comprising one or more compounds of Formula 1 and confirmed an excellent effect exhibited by the composition to thereby complete the present invention. Compositions, formulations and dosage forms comprising micronized particles comprising one or more compounds represented by Formula I are provided.

In one aspect, the present invention provides a pharmaceutical composition comprising particles comprising a compound represented by Formula 1:

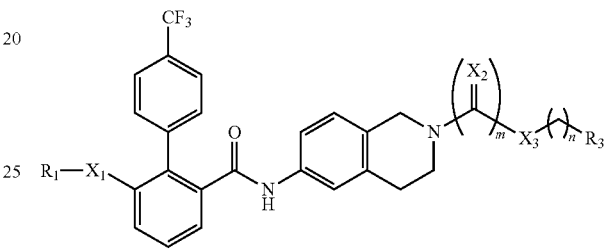

or a pharmaceutically acceptable salt thereof;
wherein
$R_1$ is optionally substituted alkyl, $R_4R_5NC(O)CH_2$, cycloalkyl, heterocyclyl, or heterocyclylalkyl;
$X_1$ is a direct bond, O, S, —$N(R_6)$—, $C(O)NR_6$, or $N(R_6)C(O)$;
$X_2$ is O, —$N(R_6)$—, or S;
$X_3$ is a direct bond, O, —$N(R_6)$—, —$CH_2$—, arylene, or S;
$R_3$ is H, alkyl, cycloalkyl, heterocyclyl, aryl, heteroaryl, heteroalkyl, aralkyl, alkylcarbonyl, alkoxycarbonyl, arylcarbonyl, aryloxycarbonyl, —OH, alkoxy, aryloxy, —SH, thioalkyl, thioaryl, or $NR_4R_5$;
$R_4$ and $R_5$ are, independently for each occurrence, H, alkyl, cycloalkyl, heterocyclyl, aryl, heteroaryl, heteroalkyl, aralkyl, aminocarbonyl, alkylcarbonyl, alkoxycarbonyl, arylcarbonyl, or aryloxycarbonyl;
$R_6$ is, independently for each occurrence, H or alkyl;
m is 0 or 1; and
n is an integer from 0 to 3;
provided that if m is 0, $X_3$ is a direct bond or $CH_2$;
wherein at least 50% of the particles are characterized by a volume particle fraction less than 30 μm, preferably less than 20 μm, preferably less than 10 μm, more preferably less than 5 μm. Preferably, at least 50% of the particles are characterized by a volume particle fraction less than 10 μm, preferably less than 5 μm, preferably less than 2.5 μm.

Preferably, each aryl or heteroaryl group independently is unsubstituted or substituted with one or more substituents, preferably selected from the group consisting of alkyl, hydroxy, alkoxy, alkylthio, cyano, halo, amino, and nitro.

Preferably, each alkyl, cycloalkyl, heterocyclylalkyl, aralkyl, alkylcarbonyl, alkoxycarbonyl, arylcarbonyl, aryloxycarbonyl, alkoxy, aryloxy, thioalkyl, or thioaryl group independently is unsubstituted or substituted with one or more substituents, preferably selected from the group consisting of $NH_2$, $C_1$-$C_6$ alkylamino, arylamino, diarylamino, heterocyclylamino, (C$_1$-C$_6$ alkyl)carbonylamino, C$_1$-C$_6$ alkoxy, C$_1$-C$_6$ alkylthio, oxo, =S, halo, nitro, hydroxyl, cyano, aryl, heteroaryl, aryloxy, arylthio, carbocyclyl, carbocyclyloxy, carbocyclylthio, carbocyclylamino, heterocyclyl, heterocyclyloxy, and heterocyclylthio.

Preferably, each heterocyclyl group independently is unsubstituted or substituted with one or more substituents preferably selected from the group consisting of halo, alkyl, and aryl.

Preferably, the particles are characterized by a volume particle fraction of at least 50%, preferably at least 80%, preferably at least 90%, under 10 μm. Preferably, the particles are characterized by a volume particle fraction of at least 90% under 10 μm. Preferably, the particles are characterized by a volume particle fraction of at least 50%, preferably at least 80%, preferably at least 90%, under 5 μm. Preferably, the particles are characterized by a volume particle fraction of at least 90% under 5 μm.

Preferably, the particles comprise a Dv90 particle distribution of less than or equal to about 10μ (micron or μm). Preferably, the particles comprise a Dv90 particle distribution of less than or equal to about 5 μm.

Compositions, formulations and dosage forms include 0.1μ size particles and up to 10μ size particles, for example, particles less than about 10μ particles, particles less than about 5μ particles, in a matrix or medium in which a homogeneous dispersion of the particles is provided. Among other advantages, a homogeneous dispersion (e.g., substantially uniform or uniform) of particles in a formulation or dosage form can provide for a greater uniformity (e.g., consistency) of release of the compound of Formula 1 from the formulation or dosage form upon in vitro testing and/or in vivo administration.

Preparations of particles of less than or equal to about 10μ or less than or equal to about are also advantageous, among other things, for promoting and maintaining the suspension (e.g., substantially uniform or uniform suspension) of the particles within a desired solid, semi-solid or fluid (e.g., liquid) composition, formulation or dosage form, including to maintain the dispersion of particles in the suspension within a fluid composition of formulation or dosage form. Compositions, formulations or dosage forms comprising particles of the invention include those that are oral, transdermal, suppository or liquid suspensions. A homogeneous dispersion of particles may provide for a greater uniformity and/or greater stability in a formulation or dosage form.

Preferably, the compound is represented by Formula 2:

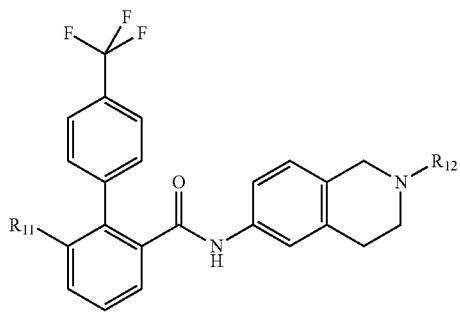

(II)

wherein R$_{11}$ is a substituted or unsubstituted alkoxy group, preferably methoxy, and R$_{12}$ is a substituted or unsubstituted aryloxycarbonyl or aralkyoxycarbonyl.

Preferably, the compound is:

Preferably, the median particle diameter less than 100 μm, preferably less than 50 μm, preferably less than 40 μm, more preferably less than 25 μm. Preferably, the median particle diameter less than 10 μm, preferably less than 5 μm, preferably less than 4 μm, more preferably less than 2.5 μm.

Preferably, the particle size is measured prior to formulation.

Preferably, the particle size is the primary particle size.

Preferably, the particles can be suspended in water and/or synthetic gastric medium.

Preferably, the particles are ground, spray dried, milled or micronized. Preferably, the particles are micronized.

Preferably, the particles are formulated into a unit dosage form for oral delivery.

Preferably, the particles are formulated into a tablet or a capsule.

In another aspect, the invention provides a method of inhibiting microsomal triglyceride transfer protein in a subject comprising orally administering a composition as described herein.

In another aspect, the invention provides a method of treating loss of intestinal homeostasis, such as dyslipidemia, hyperlipidemia, metabolic syndrome, or a lipid-related metabolic disorder, in a subject comprising orally administering a composition as described herein.

In another aspect, the invention provides a method of treating gastrointestinal (GI) tract mucosal inflammation or GI inflammatory diseases in a subject comprising orally administering a composition as described herein.

In another aspect, the invention provides a method of inhibiting absorption, assembly, and/or transport of lipids, cholesterol, and/or microbial metabolites in the GI tract of a subject comprising orally administering a composition as described herein, wherein an inhibition of absorption, assembly, and/or transport of lipids, cholesterol, and/or microbial metabolites in the GI tract of the subject.

In another aspect, the invention provides a method of treating a disorder in a subject comprising orally administering a composition as described herein, wherein the disorder is the metabolic disease is hypertriglyceridemia, mixed dyslipidemia, atherosclerosis, obesity, or diabetes.

Preferably, in any of the methods herein, the compound has less than 10% oral bioavailability, preferably less than 3%, and more preferably less than 1% oral bioavailability.

Preferably, in any of the methods herein, the compound is not substantially systemically absorbed.

Preferably, in any of the methods herein, the particles comprise a therapeutically effective amount of compound.

Preferably, in any of the methods herein, the composition is administered within 60 minutes, preferably within 30 minutes of a meal.

Preferably, in any of the methods herein, the subject has a history of acute heart failure, atrial fibrillation, hypoalbuminemia, or high inflammatory activity.

Preferably, in any of the methods herein, serum triglycerides are reduced in the subject.

Preferably, in any of the methods herein, the volume particle fraction comprises a therapeutically effective amount of the compound. Preferably, the volume particle fraction comprises less than 100 mg compound, preferably less than 50 mg, preferably less than 30 mg per unit dose. Preferably, the composition comprises less than 500 mg compound, preferably less than 300 mg, preferably less than 250 mg per unit dose.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
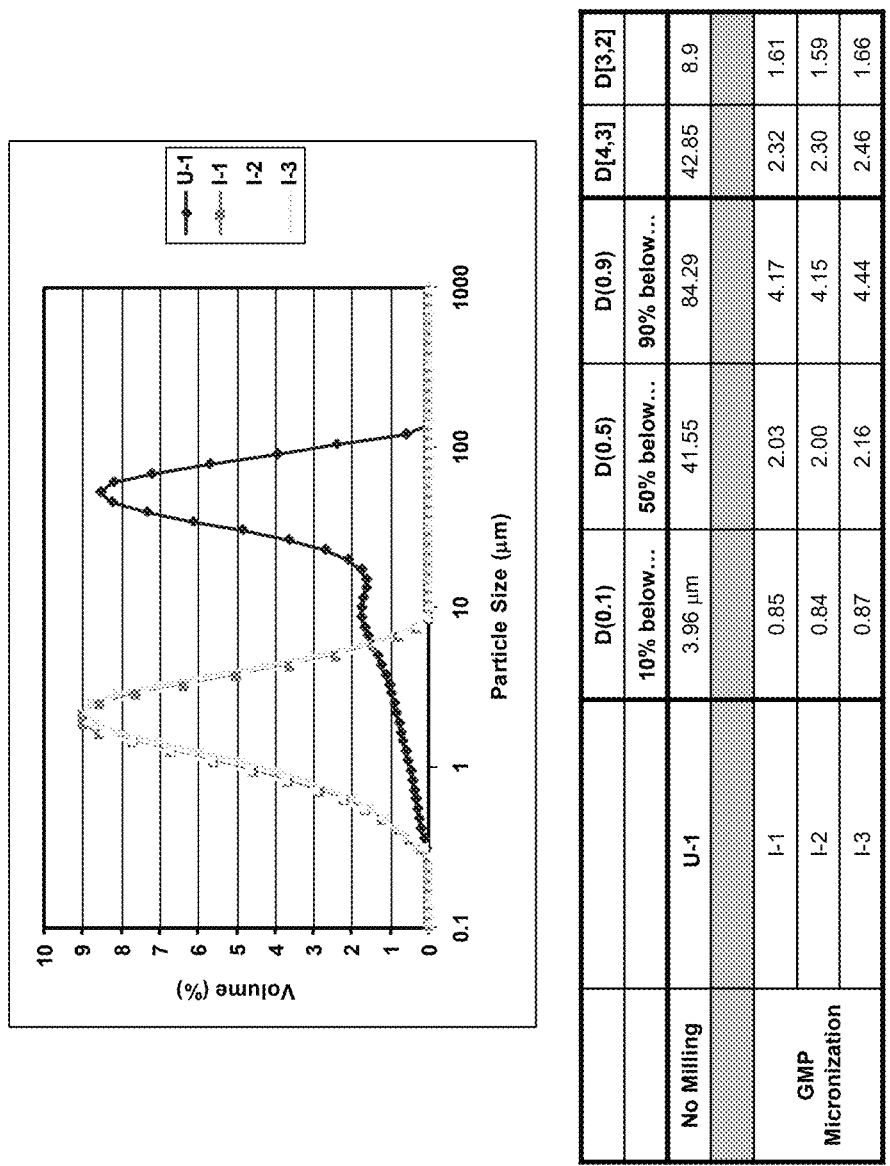
FIG. 1 depicts a particle size comparison between a micronized and non-micronized compound of the invention. Micronization was performed with a fluid energy 00 Jet-O-mizer, with N2 carrier gas at a pressure of 80 psi and a feed rate of ~190 g/h.

Compositions, formulations, and dosage forms comprising particles comprising one or more compounds represented by Formula I are provided.

In one aspect, the present invention provides a pharmaceutical composition comprising particles comprising one or more compounds represented by Formula I:

(I)

or a pharmaceutically acceptable salt, solvate, ester or hydrate thereof;

wherein $R_1$ is alkyl (optionally substituted, e.g., with one to three substituents, e.g., halogen, amino, or alkoxy groups), $R_4R_5NC(O)CH_2$, cycloalkyl, heterocyclyl, or heterocyclylalkyl;

$X_1$ is a direct bond, O, S, —N($R_6$)—, C(O)N$R_6$, or N($R_6$)C(O);

$X_2$ is O, —N($R_6$)—, or S;

$X_3$ is a direct bond, O, —N($R_6$)—, —CH$_2$—, arylene, or S;

$R_3$ is H, alkyl, cycloalkyl, heterocyclyl, aryl, heteroaryl, heteroalkyl, aralkyl, alkylcarbonyl, alkoxycarbonyl, arylcarbonyl, aryloxycarbonyl, —OH, alkoxy, aryloxy, —SH, thioalkyl, thioaryl, or N$R_4R_5$;

$R_4$ and $R_5$ are, independently for each occurrence, H, alkyl, cycloalkyl, heterocyclyl, aryl, heteroaryl, heteroalkyl, aralkyl, aminocarbonyl, alkylcarbonyl, alkoxycarbonyl, arylcarbonyl, or aryloxycarbonyl;

$R_6$ is, independently for each occurrence, H or alkyl;

m is 0 or 1; and n is an integer from 0 to 3;

provided that if m is 0, $X_3$ is a direct bond or CH$_2$;

wherein at least 50% of the particles are characterized by a volume particle fraction less than 30 μm, preferably less than 20 μm, preferably less than 10 μm, more preferably less than 5 μm. Preferably, at least 50% of the particles are characterized by a volume particle fraction less than 10 μm, preferably less than 5 μm, preferably less than 2.5 μm.

Preferably, each aryl or heteroaryl group is independently unsubstituted or substituted with one or more substituents, preferably selected from the group consisting of alkyl, hydroxy, alkoxy, alkylthio, cyano, halo, amino, and nitro.

Preferably, each alkyl, cycloalkyl, heterocyclylalkyl, aralkyl, alkylcarbonyl, alkoxycarbonyl, arylcarbonyl, aryloxycarbonyl, alkoxy, aryloxy, thioalkyl, or thioaryl group is independently unsubstituted or substituted with one or more substituents, preferably selected from the group consisting of NH$_2$, $C_1$-$C_6$ alkylamino, arylamino, diarylamino, heterocyclylamino, ($C_1$-$C_6$ alkyl)carbonylamino, $C_1$-$C_6$ alkoxy, $C_1$-$C_6$ alkylthio, oxo, =S, halo, nitro, hydroxyl, cyano, aryl, heteroaryl, aryloxy, arylthio, carbocyclyl, carbocyclyloxy, carbocyclylthio, carbocyclylamino, heterocyclyl, heterocyclyloxy, and heterocyclylthio.

Preferably, each heterocyclyl group is independently unsubstituted or substituted with one or more substituents preferably selected from the group consisting of halo, alkyl, and aryl.

In certain preferred embodiments, $X_1$ is O. In certain preferred embodiments, $R_1$ is alkyl, more preferably methyl. In certain preferred embodiments, $R_1$ and $X_1$ taken together form a moiety selected from the group consisting of:

($C_1$-$C_6$-alkyl)-O— (e.g., H$_3$C—O—, CH$_3$CH$_2$—O—, (CH$_3$)$_2$CH—O—);

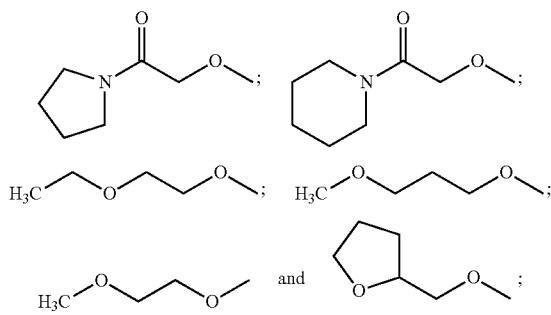

most preferably, $R_1$ and $X_1$ taken together form $CH_3$—O—.

In certain preferred embodiments, m is 1. In certain preferred embodiments, when m is 1, $X_3$ is O or NH. In certain preferred embodiments, n is 0, 1 or 2. In certain preferred embodiments, $R_3$ is aryl, more preferably unsubstituted or substituted phenyl. In other preferred embodiments, $R_3$ is cycloalkyl, heterocyclyl, heteroaryl, or alkoxy. In certain preferred embodiments, the moiety represents one of the following groups:

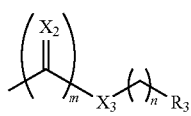

represents one of the following groups:

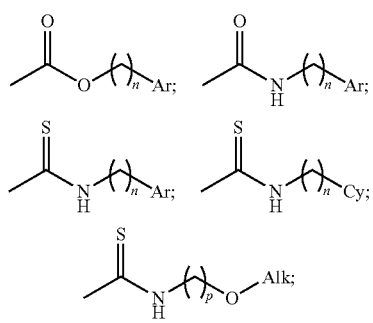

in which Ar is optionally substituted aryl or optionally substituted heteroaryl; Cy is optionally substituted cycloalkyl or optionally substituted heterocyclyl; Alk is optionally substituted alkyl; n is 0-3; and p is 1-3. In certain preferred embodiments, n is 0 or 1. In certain preferred embodiments, Ar is optionally substituted phenyl or optionally substituted furan-2-yl; Cy is optionally substituted cyclopropyl or tetrahydrofuran-2-yl; and Alk is methyl, ethyl, or isopropyl.

In more preferred embodiments, the moiety

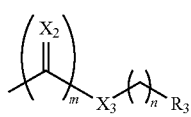

represents one of the following groups

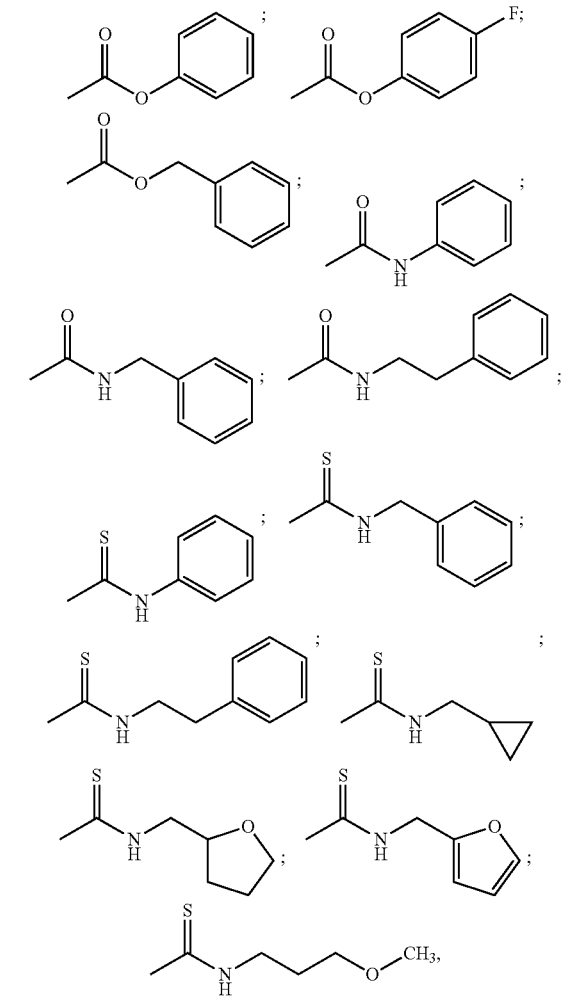

Preferably, the compound is represented by Formula 2:

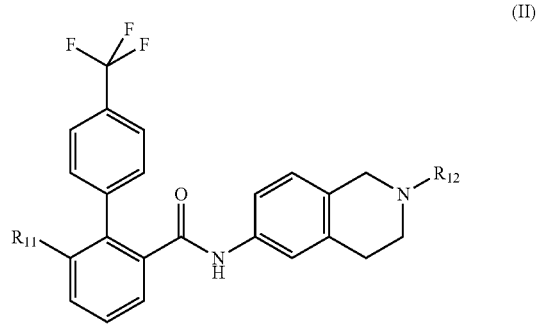

wherein $R_{11}$ is H or a substituted or unsubstituted alkoxy group, and $R_{12}$ is a substituted or unsubstituted aryloxycarbonyl or aralkyoxycarbonyl.

Preferably, $R_{11}$ is H or a substituted or unsubstituted alkoxy group. Preferably, $R_{11}$ is selected from:

H;  $H_3C$—O—,

9

-continued

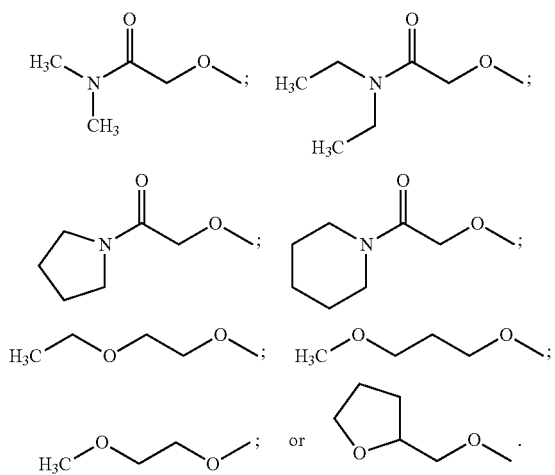

Preferably, R₁₁ is not H. Preferably, R₁₁ is methoxy.
Preferably, R₁₂ is selected from:

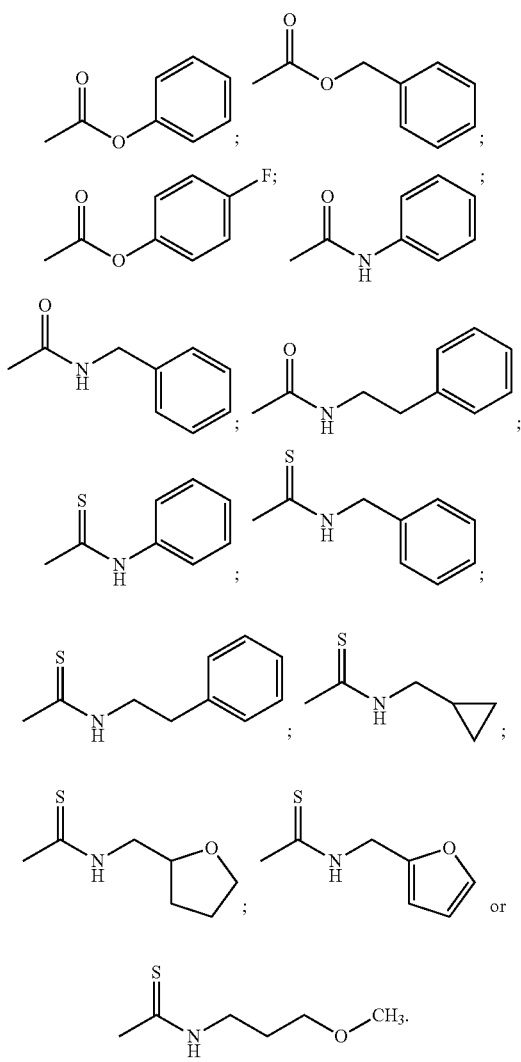

10

Preferably, the compound is represented by Formula 3 (also referred to as "Compound 3")

(Formula 3)

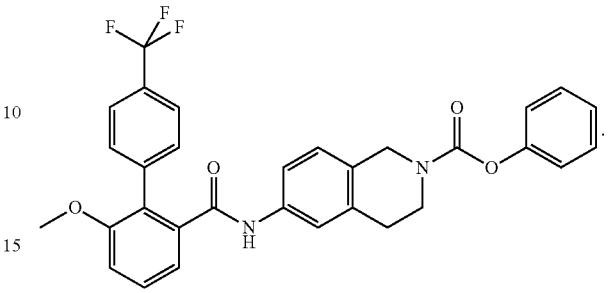

or a pharmaceutically acceptable salt, ester, isomer, or hydrate thereof.

As used herein, the term "alkyl" means a saturated straight chain or branched non-cyclic hydrocarbon typically having from 1 to 10 carbon atoms, more preferably from 1 to 6 carbon atoms. Representative straight chain alkyls include methyl, ethyl, n-propyl, n-butyl, n-pentyl, n-hexyl, n-heptyl, n-octyl, n-nonyl and n-decyl; branched alkyls include isopropyl, sec-butyl, isobutyl, tert-butyl, isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, 2,3-dimethylpentyl, 2,4-dimethylpentyl, 2,3-dimethylhexyl, 2,4-dimethylhexyl, 2,5-dimethylhexyl, 2,2-dimethylpentyl, 2,2-dimethylhexyl, 3,3-dimethylpentyl, 3,3-dimethylhexyl, 4,4-dimethylhexyl, 2-ethylpentyl, 3-ethylpentyl, 2-ethylhexyl, 3-ethylhexyl, 4-ethylhexyl, 2-methyl-2-ethylpentyl, 2-methyl-3-ethylpentyl, 2-methyl-4-ethylpentyl, 2-methyl-2-ethylhexyl, 2-methyl-3-ethylhexyl, 2-methyl-4-ethylhexyl, 2,2-diethylpentyl, 3,3-diethylhexyl, 2,2-diethylhexyl, 3,3-diethylhexyl and the like. Alkyl groups included in compounds of this invention may be optionally substituted with one or more substituents (preferably one to three substituents), such as amino (NH₂), $C_1$-$C_6$ alkylamino, $C_1$-$C_6$ dialkylamino, arylamino, diarylamino, heterocyclylamino, ($C_1$-$C_6$ alkyl)carbonylamino, $C_1$-$C_6$ alkoxy, $C_1$-$C_6$ alkylthio, oxo, =S, halo (including F, Cl, Br, and I), nitro, hydroxyl, cyano, aryl, heteroaryl, aryloxy, arylthio, carbocyclyl, carbocyclyloxy, carbocyclylthio, carbocyclylamino, heterocyclyl, heterocyclyloxy, heterocyclylthio, and the like. Lower alkyls (having from 1 to 6 carbon atoms in the alkyl chain) are typically preferred for the compounds of this invention.

As used herein, the term "cycloalkyl", as used herein, refers to a cyclic alkyl group having from 3 to 10 carbon atoms in the ring, more preferably 3-6 carbon atoms in the ring. Exemplary cycloalkyl groups include cyclopropyl, cyclobutyl, cyclopentyl, and cyclohexyl. Cycloalkyls may be substituted by one or more substituents (e.g., one to three substituents) as described above for alkyl groups.

As used herein, the term "heterocycle" or "heterocyclyl" means a monocyclic or polycyclic heterocyclic ring (typically having 3- to 14-members) which is either a saturated ring or a unsaturated non-aromatic ring. A 3-membered heterocycle can contain up to 3 heteroatoms, and a 4- to 14-membered heterocycle can contain from 1 to about 8 heteroatoms. Each heteroatom is independently selected from nitrogen, which can be quaternized; oxygen; and sulfur, including sulfoxide and sulfone. The heterocycle may be attached via any heteroatom or carbon atom. Representative heterocycles include morpholinyl, thiomorpholinyl, pyrrolidinonyl, pyrrolidinyl, piperidinyl, piperazinyl, hydantoinyl, valerolactamyl, oxiranyl, oxetanyl, tetrahydrofuranyl, tetrahydropyranyl, tetrahydropyrindinyl, tetrahydropyrimidinyl, tetrahydrothiophenyl, tetrahydrothiopyranyl, and the like. A heteroatom may be substituted with a protecting group known to those of ordinary skill in the art, for example, the hydrogen on a nitrogen may be substituted with a tert-butoxycarbonyl group. Furthermore, the heterocyclyl may be optionally substituted with one or more substituents, e.g., one to three substituents (including without limitation a halogen atom, an alkyl radical, or aryl radical). Only stable isomers of such substituted heterocyclic groups are contemplated in this definition. Heterocyclyl groups can be substituted or unsubstituted.

As used herein, the term an "aromatic ring" or "aryl" means a monocyclic or polycyclic-aromatic ring or ring radical comprising carbon and hydrogen atoms. Examples of suitable aryl groups include, but are not limited to, phenyl, tolyl, anthacenyl, fluorenyl, indenyl, azulenyl, and naphthyl, as well as benzo-fused carbocyclic moieties such as 5,6,7,8-tetrahydronaphthyl. An aryl group can be unsubstituted or, optionally, substituted with one or more substituents, e.g., one to three substituents (including without limitation alkyl (preferably, lower alkyl or alkyl substituted with one or more halo), hydroxy, alkoxy (preferably, lower alkoxy), alkylthio, cyano, halo, amino, and nitro. In certain embodiments, the aryl group is a monocyclic ring, wherein the ring comprises 6 carbon atoms.

As used herein, the term "heteroaromatic" or "heteroaryl" means a monocyclic or polycyclic heteroaromatic ring (or radical thereof) comprising carbon atom ring members and one or more heteroatom ring members (such as, for example, oxygen, sulfur or nitrogen). Typically, the heteroaromatic ring has from 5 to about 14 ring members in which at least 1 ring member is a heteroatom selected from oxygen, sulfur and nitrogen. In another embodiment, the heteroaromatic ring is a 5- or 6-membered ring and may contain from 1 to about 4 heteroatoms. In another embodiment, the heteroaromatic ring system has 7 to 14 ring members and may contain from 1 to about 7 heteroatoms. Representative heteroaryls include pyridyl, furyl, thienyl, pyrrolyl, oxazolyl, imidazolyl, indolizinyl, thiazolyl, isoxazolyl, pyrazolyl, isothiazolyl, pyridazinyl, pyrimidinyl, pyrazinyl, triazinyl, triazolyl, pyridinyl, thiadiazolyl, pyrazinyl, quinolyl, isoquniolyl, indazolyl, benzoxazolyl, benzofuryl, benzothiazolyl, indolizinyl, imidazopyridinyl, isothiazolyl, tetrazolyl, benzimidazolyl, benzoxazolyl, benzothiazolyl, benzothiadiazolyl, benzoxadiazolyl, indolyl, tetrahydroindolyl, azaindolyl, imidazopyridyl, qunizaolinyl, purinyl, pyrrolo[2,3]pyrimidyl, pyrazolo[3,4]pyrimidyl or benzo(b)thienyl and the like. These heteroaryl groups may be optionally substituted with one or more substituents, e.g., one to three substituents as described for aryl groups.

As used herein, the term "halogen" or "halo" means —F, —Cl, —Br or —I.

As used herein, the term "alkylene," as used herein, refers to an alkyl group that has two points of attachment to two moieties (e.g., {—CH$_2$—}, -{CH$_2$CH$_2$—},

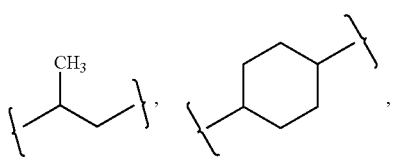

etc., wherein the brackets indicate the points of attachment). Alkylene groups may be unsubstituted or optionally substituted with one or more substituents, e.g., 1-3 substituents as described for alkyl groups. Exemplary alkylene groups include methylene, ethylene, and propylene.

As used herein, the term "arylene," as used herein, refers to an aryl or heteroaryl group that has two points of attachment to two moieties. Arylene groups may be unsubstituted or optionally substituted with one or more substituents, e.g., 1-3 substituents as described for alkyl groups. Exemplary arylene groups include phenyl-1,2-diyl, phenyl-1,3-diyl, and phenyl-1,4-diyl-; thiazol-2,4-diyl, and the like.

As used herein, the term "aralkyl", as used herein, refers to an aryl group that is attached to another moiety via an alkylene linker. Aralkyl groups may be unsubstituted or optionally substituted with one or more substituents, e.g., 1-3 substituents as described for alkyl groups.

As used herein, the term "heterocyclylalkyl," as used herein, refers to a heterocyclyl group that is attached to another moiety via an alkylene linker. Heterocyclylalkyl groups may be unsubstituted or optionally substituted with one or more substituents, e.g., 1-3 substituents as described for alkyl groups.

As used herein, the term "alkylcarbonyl," as used herein, refers to the group —C(O)-alkyl. The alkyl portion of the alkylcarbonyl moiety can be unsubstituted or optionally substituted with one or more substituents, e.g., 1-3 substituents as described above for alkyl groups.

As used herein, the term "alkoxycarbonyl," as used herein, refers to the group —C(O)—O— alkyl. The alkyl portion of the alkoxycarbonyl moiety can be unsubstituted or optionally substituted with one or more substituents, e.g., 1-3 substituents as described above for alkyl groups.

As used herein, the term "arylcarbonyl," as used herein, refers to the group —C(O)-aryl or —C(O)-heteroaryl. The aryl or heteroaryl portion of the arylcarbonyl moiety can be unsubstituted or optionally substituted with one or more substituents, e.g., 1-3 substituents as described above for alkyl groups.

As used herein, the term "aryloxycarbonyl," as used herein, refers to the group —C(O)—O-aryl or —C(O)—O-heteroaryl. The aryl or heteroaryl portion of the aryloxycarbonyl moiety can be unsubstituted or optionally substituted with one or more substituents, e.g., 1-3 substituents as described above for alkyl groups.

As used herein, the term "aminocarbonyl," as used herein, refers to the groups —C(O)—NR$_a$R$_b$, in which R$_a$ and R$_b$ are independently H, alkyl, aryl, heteroaryl, cycloalkyl, or heterocyclyl. The alkyl, aryl, heteroaryl, cycloalkyl, or heterocyclyl portion of the aminocarbonyl moiety can be unsubstituted or optionally substituted with one or more substituents, e.g., 1-3 substituents as described above for alkyl groups.

As used herein, the term "alkoxy," as used herein, refers to the group —O-alkyl. The alkyl portion of the alkoxy moiety can be unsubstituted or optionally substituted with one or more substituents, e.g., 1-3 substituents as described above for alkyl groups.

As used herein, the term "aryloxy," as used herein, refers to the group —O-aryl or —O— heteroaryl. The aryl or heteroaryl portion of the aryloxy moiety can be unsubstituted or optionally substituted with one or more substituents, e.g., 1-3 substituents as described above for alkyl groups.

As used herein, the term "thioalkoxy," as used herein, refers to the group —S-alkyl. The alkyl portion of the thioalkoxy moiety can be unsubstituted or optionally substituted with one or more substituents, e.g., 1-3 substituents as described above for alkyl groups.

As used herein, the term "thioaryloxy," as used herein, refers to the group —S-aryl or —S— heteroaryl. The aryl or heteroaryl portion of the thioaryloxy moiety can be unsubstituted or optionally substituted with one or more substituents, e.g., 1-3 substituents as described above for alkyl groups.

Preferably, the particles are characterized by a volume particle fraction of at least 50%, preferably at least 80%, preferably at least 90%, under 10 µm. Preferably, the particles are characterized by a volume particle fraction of at least 90% under 10 µm. Preferably, the particles are characterized by a volume particle fraction of at least 50%, preferably at least 80%, preferably at least 90%, under 5 µm. Preferably, the particles are characterized by a volume particle fraction of at least 90% under 5 µm.

Preferably, the particles comprise a Dv90 particle distribution of less than or equal to about 10µ (micron or m). Preferably, the particles comprise a Dv90 particle distribution of less than or equal to about 5 µm.

The present disclosure provides compositions, formulations and dosage forms comprising particles comprising one or more compounds of Formula 1, including preparations of such particles with a Dv90 particle distribution of less than or equal to 10 or less than or equal to 5. Preparations of such particles preferably do not include a significant amount of particles with a particle size distribution under or equal to 0.1µ (e.g., less than or equal to 1% under 0.1µ), or under or equal to 1.0 (e.g., less than or equal to 10% under 1.0).

Preferably, the particles comprising one or more compounds of Formula 1 have a $DV_{90}$ particle size distribution of 2 µm to 6 µm. Preferably, a $DV_{90}$ particle size distribution of 2 µm to m. Preferably, a $DV_{90}$ particle size distribution of 2 µm to 4.5 µm. Preferably, a $DV_{90}$ particle size distribution of 2 µm to 4 µm.

Preferably, the particles comprising one or more compounds of Formula 1 have a $DV_{50}$ particle size distribution of 2.5 µm to 1 µm. Preferably, the particles comprising one or more compounds of Formula 1 have a $DV_{50}$ particle size distribution of 2 µm to 1 µm.

Preferably, the particles comprising one or more compounds of Formula 1 have a $DV_{10}$ particle size distribution of 0.1 µm to 1 µm.

Preferably, the particles comprising one or more compounds of Formula 1 have a $DV_{90}$ particle size distribution of 2 µm to 6 µm, preferably, a $DV_{90}$ particle size distribution of 2 µm to 5 µm, preferably, a $DV_{90}$ particle size distribution of 2 µm to 4.5 µm, preferably, a $DV_{90}$ particle size distribution of 2 µm to 4 µm; a $DV_{50}$ particle size distribution of 2.5 µm to 1 µm, preferably, a $DV_{50}$ particle size distribution of 2 µm to 1 µm; and a $DV_{10}$ particle size distribution of 0.1 µm to 1 µm.

Preferably, the particles comprising one or more compounds of Formula 1 have a $DV_{90}$ particle size distribution of 2 µm to 5 µm; a $DV_{50}$ particle size distribution of 2.5 µm to 1 µm; and a $DV_{10}$ particle size distribution of 0.1 µm to 1 µm. Preferably, the particles comprising one or more compounds of Formula 1 have a $DV_{90}$ particle size distribution of 2 µm to 5 µm; a $DV_{50}$ particle size distribution of 2 µm to 1 µm; and a $DV_{10}$ particle size distribution of 0.1 µm to 1 µm.

Preferably, the particles comprising one or more compounds of Formula 1 have a $DV_{90}$ particle size distribution of 2 µm to 4.5 µm; a $DV_{50}$ particle size distribution of 2.5 µm to 1 µm; and a $DV_{10}$ particle size distribution of 0.1 µm to 1 µm. Preferably, the particles comprising one or more compounds of Formula 1 have a $DV_{90}$ particle size distribution of 2 µm to 4.5 µm; a $DV_{50}$ particle size distribution of 2 µm to 1 µm; and a $DV_{10}$ particle size distribution of 0.1 µm to 1 µm.

Compositions, formulations and dosage forms include 0.1µ size particles and up to 10µ size particles, for example, particles less than about 10µ particles, particles less than about 5µ particles, in a matrix or medium in which a homogeneous dispersion of the particles is provided. Among other advantages, a homogeneous dispersion (e.g., substantially uniform or uniform) of particles in a formulation or dosage form can provide for a greater uniformity (e.g., consistency) of release of the compound of Formula 1 from the formulation or dosage form upon in vitro testing and/or in vivo administration.

Preparations of particles of less than or equal to about 10µ or less than or equal to about 5µ are also advantageous, among other things, for promoting and maintaining the suspension (e.g., substantially uniform or uniform suspension) of the particles within a desired solid, semi-solid or fluid (e.g., liquid) composition, formulation or dosage form, including to maintain the dispersion of particles in the suspension within a fluid composition of formulation or dosage form. Compositions, formulations or dosage forms comprising particles of the invention include those that are oral, transdermal, suppository or liquid suspensions. A homogeneous dispersion of particles may provide for a greater uniformity and/or greater stability in a formulation or dosage form.

The compositions may be provided in a liquid suspension or a non-tablet dosage form. Such non-tablet dosage forms may include a capsule, a suppository, a suspension (e.g., oral, otic, ophthalmic, topical, etc.).

Particle preparations of the invention include particles with targeted and consistent particle size distribution, suitable and/or improved powder flow characteristics without significant particle agglomeration behavior, substantially or essentially free of undesirable physical transformations as compared to a non-micronized preparation of compounds of Formula 1. Such particle preparations are characterized by a stable appearance, chemical stability, for example, as measured by HPLC, stable chromatographic purity profile, static water content (e.g., less than about 1.0%, after 12 months stored at 25° C./60% RH) and/or stable distribution of particle size.

Any of a variety of dosage forms and/or delivery methods can be used in conjunction with a composition, formulation or dosage form of the present disclosure. Delivery methods and/or dosage forms suitable for use with the compositions, formulations or dosage forms of the present disclosure can take advantage of any of a variety of drug release mechanisms. For example, dosage forms suitable for use as described herein may be adapted for retaining a quantity of drug formulation (e.g., contained in a drug reservoir or solubilized, suspended or integrated into a vehicle, substrate or matrix such as a polymer, wax, binding solid, liquid etc.) sufficient for treatment, including for a pre-selected period, including for an administration period ranging from one to several hours, one to several weeks, one to several months or up to one or more years. For example, formulations and dosage forms for use as described herein may be adapted for modified release such as immediate, controlled, sustained delayed or targeted release (or combinations thereof).

Exemplary dosage forms include drug delivery devices (e.g., drug pumps, including osmotic pumps), implants (e.g., bioerodable implants), sustained release injectables (e.g., injectable liquid formulations, gels including hydrogels such as collagen hydrogels), microparticulate suspensions, microsphere suspensions, liposome formulations, micelle formulations, oil suspensions (including emulsions), wax-based formulations (e.g., suppositories) or encapsulated particulate suspensions. Exemplary drug delivery dosage forms that may be suitable for use with the present disclosure are described in Encyclopedia of Controlled Drug Delivery (1999), Edith Mathiowitz (Ed.), John Wiley & Sons, Inc. A dosage form can be selected from, for example, any of a variety of conventional drug release devices that are conventionally used as an external element (e.g., an external pump) or implanted element of a drug delivery system or oral dosage forms including osmotic dosage forms.

Pharmaceutical Composition

The pharmaceutical composition of the invention comprises particles comprising one or more compounds of Formula 1 as described herein and a pharmaceutically-acceptable carrier. Suitable pharmaceutically acceptable carriers include, but are not limited to, excipients, inert solid fillers or diluents, and sterile aqueous or organic solutions. The active compound will be present in such pharmaceutical compositions in amounts sufficient to provide the desired dosage amount in the range described below.

Pharmaceutical compositions can be prepared, packaged, and/or sold in bulk, as a single unit dose, and/or as a plurality of single unit doses. A "unit dose" is a discrete amount of the pharmaceutical composition comprising a predetermined amount of the active ingredient. The amount of the active ingredient is generally equal to the dosage of the active ingredient which would be administered to a subject and/or a convenient fraction of such a dosage, such as one-half or one-third of such a dosage.

Preferably, the pharmaceutical compositions of the present invention are orally administrable and are accordingly used in combination with a pharmaceutically acceptable carrier or diluent suitable to oral dosage forms. Thus, for oral administration the pharmaceutical compositions can be combined with a suitable solid or liquid carrier or diluent to form capsules, tablets, pills, powders, syrups, solutions, suspensions and the like. The pharmaceutical compositions may, if desired, contain additional components such as flavorants, sweeteners, excipients and the like.

The tablets, pills, capsules, and the like may also contain a binder such as gum tragacanth, acacia, corn starch or gelatin; excipients such as dicalcium phosphate; a disintegrating agent such as corn starch, potato starch, alginic acid; a lubricant such as magnesium stearate; and a sweetening agent such as sucrose, lactose or saccharin. When a dosage unit form is a capsule, it may contain, in addition to materials of the above type, a liquid carrier such as a fatty oil.

Various other materials may be present as coatings or to modify the physical form of the dosage unit. For instance, tablets may be coated with shellac, sugar or both. A syrup or elixir may contain, in addition to the active ingredient, sucrose as a sweetening agent, methyl and propylparabens as preservatives, a dye and a flavoring such as cherry or orange flavor.

These pharmaceutical compositions of the invention may also be administered parenterally. For parenteral administration the pharmaceutical compositions can be combined with sterile aqueous or organic media to form injectable solutions or suspensions. Solutions or suspensions of these active compounds can be prepared in water suitably mixed with a surfactant such as hydroxypropylcellulose. Dispersions can also be prepared in sesame or peanut oil, ethanol, water, polyol (e.g., glycerol, propylene glycol and liquid polyethylene glycol), suitable mixtures thereof, vegetable oils, N-methyl glucamine, polyvinylpyrrolidone and mixtures thereof in oils as well as aqueous solutions of water-soluble pharmaceutically acceptable salts of the compounds. Under ordinary conditions of storage and use, these preparations contain a preservative to prevent the growth of microorganisms. The injectable solutions prepared in this manner can then be administered intravenously, intraperitoneally, subcutaneously, or intramuscularly.

The pharmaceutical forms suitable for injectable use include sterile aqueous solutions or dispersions and sterile powders for the extemporaneous preparation of sterile injectable solutions or dispersions. In all cases, the form must be sterile and must be fluid to the extent that easy syringability exists. It must be stable under the conditions of manufacture and storage and must be preserved against the contaminating action of microorganisms such as bacteria and fungi.

An "effective amount" of a compound described herein refers to an amount sufficient to elicit the desired biological response. An effective amount of a compound described herein may vary depending on such factors as the desired biological endpoint, the pharmacokinetics of the compound, the condition being treated, the mode of administration, and the age and health of the subject. In certain embodiments, an effective amount is a therapeutically effective amount. In certain embodiments, an effective amount is a prophylactic treatment. In certain embodiments, an effective amount is the amount of a compound described herein in a single dose. In certain embodiments, an effective amount is the combined amounts of a compound described herein in multiple doses.

In certain embodiments, the effective amount of the composition contains a dose of the compound in the range of about 0.1 to about 5000 mg. For example, the dose of the compound may be in the range of 0.1-10 mg, 0.1-50 mg, 0.1-100 mg, 0.1-200 mg, 0.1-400 mg, 0.1-800 mg, 0.1-1200 mg, 0.1-2000 mg, 0.1-3000 mg, or 0.1-4000 mg. The dose of the compound may be in the range of 1-10 mg, 1-50 mg, 1-100 mg, 1-200 mg, 1-400 mg, 1-800 mg, 1-1200 mg, 1-2000 mg, 1-3000 mg, or 1-4000 mg. The dose of the compound may be in the range of 10-50 mg, 10-100 mg, 10-200 mg, 10-400 mg, 10-800 mg, 10-1200 mg, 10-2000 mg, 10-3000 mg, or 10-4000 mg. The dose of the compound may be in the range of 100-200 mg, 100-400 mg, 100-800 mg, 100-1200 mg, 100-2000 mg, 100-3000 mg, or 100-4000 mg. The dose of the compound may be in the range of 200-1000 mg, 400-1000 mg, 800-1000 mg, 1000-2000 mg, 2000-3000 mg, or 3000-4000 mg.

In certain embodiments, the effective amount of the composition contains a dose of the compound in the range of about 1 to about 1200 mg/kg body weight. In certain embodiments, the effective amount of the composition contains a dose of the compound in the range of about 5 to about 800 mg/kg body weight. In certain embodiments, the effective amount of the composition contains a dose of the compound in the range of about 0.1 to about 15 mg/kg body weight. In certain embodiments, the effective amount of the composition contains a dose of the compound in the range of about 1 to about 5 mg/kg body weight.

The dose of a compound of Formula I or II which is administered will generally be varied according to principles well known in the art taking into account the severity of the condition being treated and the route of administration. In general, a compound of Formula I or II will be administered to a warm blooded animal (such as a human) so that an effective dose, usually a daily dose administered in unitary or divided portions, is received, for example a dose in the range of about 0.1 to about 15 mg/kg body weight, preferably about 1 to about 5 mg/kg body weight. The total daily dose received will generally be between 1 and 1200 mg, preferably between 5 and 800 mg. In certain preferred embodiments, a compound of Formula I or II may be administered in divided doses taken with meals, e.g., three times daily, in which case each dose can be, e.g., between 5 and 500 mg.

Preferably, the volume particle fraction comprises a therapeutically effective amount of the compound. Preferably, the volume particle fraction comprises less than 100 mg compound, preferably less than 50 mg, preferably less than 30 mg per unit dose.

Preferably, the composition comprises less than 500 mg compound, preferably less than 300 mg, preferably less than 250 mg per unit dose. Preferably, the composition comprises 400 mg per unit dose. Preferably, the composition comprises 200 mg per unit dose.

The pharmaceutical compositions of this invention may be used in conjunction with other pharmaceutical agents, including other lipid lowering agents. Such agents include cholesterol biosynthesis inhibitors, especially HMG CoA reductase inhibitors (such as atorvastatin, pravastatin, simvastatin, lovastatin, fluvastatin, cerivastatin, rosuvastatin, and pitivastatin (itavastatin/risivastatin)); squalene synthetase inhibitors; bile acid sequestrants such as cholestyramine; fibrates (bezafibrate, clofibrate, fenofibrate); cholesterol absorption inhibitors such as ezetimibe and pamaqueside; and niacin.

In certain embodiments, the pharmaceutical composition is formulated for controlled release within the lower intestine or colon of a subject. Such a pharmaceutical composition may be further formulated for enteric delivery. Solid dosage forms of the compositions (e.g., pharmaceutical compositions) of the invention may optionally be scored or prepared with coatings and shells, such as enteric coatings and other coatings. They may also be formulated so as to provide slow or sustained release of the active ingredients therein. For example, ethyl cellulose, hydroxypropyl cellulose, hydroxypropyl methyl cellulose, and combinations thereof, in varying proportions to provide the desired release profile, other polymer matrices. They may be sterilized by, for example, filtration through a bacteria-retaining filter, or by incorporating sterilizing agents in the form of sterile solid compositions which can be dissolved in sterile water, or some other sterile injectable medium immediately before use. These compositions may also optionally contain opacifying agents and may be of a composition that they release the active ingredients only in a certain portion of the gastrointestinal tract, optionally, in a delayed manner. Examples of embedding compositions which can be used include polymeric substances.

As used herein, "controlled-release" means a dosage form in which the release of the active agent is controlled or modified over a period of time. Controlled can mean, for example, sustained, delayed or pulsed-release at a particular time. For example, controlled-release can mean that the release of the active ingredient is extended for longer than it would be in an immediate-release dosage form, i.e., at least over several hours.

As used herein, "immediate-release" means a dosage form in which greater than or equal to about 75% of the active ingredient is released within two hours, or, more specifically, within one hour, of administration. Immediate-release or controlled-release may also be characterized by their dissolution profiles.

A coating on a solid dosage form (e.g., to achieve controlled or sustained release) may be applied in the form of an organic or aqueous solution or dispersion. The coating may be applied to obtain a weight gain from about 1 to about 25% of the substrate in order to obtain a desired sustained release profile or controlled-release profile. Such formulations are described, e.g., in detail in U.S. Pat. Nos. 5,273,760 and 5,286,493; both incorporated herein by reference in their entirety. Other examples of controlled and sustained release formulations and coatings which may be used in accordance with the invention include U.S. Pat. Nos. 5,324,351; 5,356,467, and 5,472,712; all of which are herein incorporated by reference in their entirety.

In certain embodiments, the pharmaceutical composition is formulated for immediate release. In certain embodiments, the pharmaceutical composition is formulated for controlled release. In certain embodiments, the pharmaceutical composition is a bilayer composition having multiple release profiles comprising an immediate release layer and controlled release layer (or core), such that the composition provides an immediate release of the compound of the invention followed by a controlled (e.g., extended) release of the compound of the invention. In certain embodiments, the pharmaceutical composition is a multilayer composition having multiple release profiles comprising one or more immediate release layers, one or more erodible layers, one or more controlled release layers, or combinations thereof.

The pharmaceutical compositions of the present invention may enable formulations with a modified duration of therapeutic efficacy. For example, the present compositions provide therapeutically effective amounts of one or more compounds of the invention in subjects for at least about 8 hours, at least about 12 hours, at least about 16 hours, at least about 20 hours or at least about 24 hours. Preferably, the present compositions provide therapeutically effective amounts of one or more compounds of the invention in subjects for at least about 16 hours, at least about 20 hours or at least about 24 hours.

In one embodiment, the pharmaceutical composition is a controlled release composition comprising a compound of the invention and one or more pharmaceutically acceptable carriers, wherein the controlled release composition provides a therapeutically effective amount of the compound of the invention to a subject. In another embodiment, the pharmaceutical composition is a controlled release composition comprising a compound of the invention and one or more pharmaceutically acceptable carriers, wherein the controlled release composition provides a therapeutically effective amount of the compound of the invention to a subject for at least about 16 hours to at least about 24 hours. In another embodiment, the pharmaceutical composition is a controlled release composition comprising a compound of the invention and one or more pharmaceutically acceptable carriers, wherein the controlled release composition provides a therapeutically effective amount of the compound of the invention to a subject for at least about 16 hours, at least about 17 hours, at least about 18 hours, at least about 19 hours, at least about 20 hours, at least about 21 hours, at least about 22 hours, at least about 23 hours or at least about 24 hours or longer. For example, at least about 16 hours. For example, at least about 18 hours. For example, at least about 20 hours. For example, at least about 24 hours.

The controlled-release formulations provided herein provide desirable properties and advantages. For example, the formulations can be administered once daily, which is particularly desirable for the subjects described herein. The formulation can provide many therapeutic benefits that are not achieved with corresponding shorter acting, or immediate-release preparations. For example, the formulation can maintain lower, more steady plasma peak values, for example, Cmax, so as to reduce the incidence and severity of possible side effects. Sustained-release dosage forms release their active ingredient into the gastrointestinal tract of a patient over a sustained period of time following administration of the dosage form to the patient. Particular dosage forms include: (a) those in which the active ingredient is embedded in a matrix from which it is released by diffusion or erosion; (b) those in which the active ingredient is present in a core which is coated with a release rate-controlling membrane; (c) those in which the active ingredient is present in a core provided with an outer coating impermeable to the active ingredient, the outer coating having an aperture (which may be drilled) for release of the active ingredient; (d) those in which the active ingredient is released through a semi-permeable membrane, allowing the drug to diffuse across the membrane or through liquid filled pores within the membrane; and (e) those in which the active ingredient is present as an ion exchange complex.

Pulsed-release formulations release the active compound after a sustained period of time following administration of the dosage form to the patient. The release may then be in the form of immediate- or sustained-release. This delay may be achieved by releasing the drug at particular points in the gastro-intestinal tract or by releasing drug after a predetermined time. Pulsed-release formulations may be in the form of tablets or multiparticulates or a combination of both. Particular dosage forms include: (a) osmotic potential triggered release (see U.S. Pat. No. 3,952,741); (b) compression coated two layer tablets (see U.S. Pat. No. 5,464,633); (c) capsules containing an erodible plug (see U.S. Pat. No. 5,474,784); sigmoidal releasing pellets (referred to in U.S. Pat. No. 5,112,621); and (d) formulations coated with or containing pH-dependent polymers including shellac, phthalate derivatives, polyacrylic acid derivatives and crotonic acid copolymers.

Dual release formulations can combine the active ingredient in immediate release form with additional active ingredient in controlled-release form. For example, a bilayer tablet can be formed with one layer containing immediate release active ingredient and the other layer containing the active ingredient embedded in a matrix from which it is released by diffusion or erosion. Alternatively, one or more immediate release beads can be combined with one or more beads which are coated with a release rate-controlling membrane in a capsule to give a dual release formulation. Sustained release formulations in which the active ingredient is present in a core provided with an outer coating impermeable to the active ingredient, the outer coating having an aperture (which may be drilled) for release of the active ingredient, can be coated with drug in immediate release form to give a dual release formulation. Dual release formulations can also combine drug in immediate release form with additional drug in pulsed release form. For example, a capsule containing an erodible plug could liberate drug initially and, after a predetermined period of time, release additional drug in immediate- or sustained-release form.

Most controlled-release formulations are designed to initially release an amount of drug that promptly produces the desired therapeutic effect, and gradually and continually release of additional amounts of drug to maintain this level of therapeutic effect over an extended period of time. In order to maintain this constant level of drug in the body, the drug must be released from the dosage form at a rate that will replace the amount of drug being metabolized and excreted from the body.

In one embodiment, the pharmaceutical composition of the invention comprises a controlled release core comprising a compound of the invention and an immediate release outer layer comprising a compound of the invention. In embodiments, the immediate release layer provides an initial release in an amount of drug that promptly produces the desired therapeutic effect that can last for several hours, such as for at least about 2 hours, or at least about 4 hours, or at least about 6 hours, or at least about 8 hours. The controlled release layer can then provide a continued release of additional amounts of drug to maintain this level of therapeutic effect over a period of time, such as for at least about 8 hours, at least about 10 hours, at least about 12 hours, at least about 16 hours, at least about 18 hours, at least about 20 hours.

In one embodiment, the pharmaceutical composition of the invention comprises a controlled release core comprising a compound of the invention, an erodible layer that does not comprise an active drug and an immediate release outer layer comprising a compound of the invention. The immediate release layer provides an initial release in an amount of drug that promptly produces the desired therapeutic effect that can last for several hours, such as for at least about 2 hours, or at least about 4 hours, or at least about 6 hours, or at least about 8 hours. The erodible layer provides a period of time wherein no drug is being released and delays the release of the drug from the controlled release layer during a time in which the drug would otherwise provide no therapeutic benefit to the patient. The controlled release layer can then provide a release of additional amounts of drug to provide therapeutic effect over a period of time, such as for at least about 8 hours, at least about 10 hours, at least about 12 hours, at least about 16 hours, at least about 18 hours, at least about 20 hours.

In any of the embodiments herein, the composition is administered once daily. In any of the embodiments herein, the composition is administered in the morning prior to or concurrently with the subject's first meal wherein the composition produces an immediate therapeutic effect during the first meal and wherein the composition provides a controlled release to produce the therapeutic effect throughout the rest of the day.

Methods for Micronization

The present disclosure provides methods for micronizing a compound of Formula 1 to provide a stabilized micronized composition, formulation or dosage form. Micronized can refer to particles of an agent in which the size of the particle has been reduced to a size of less than a non-micronized form of an agent. Micronized can refer to particles that have been processed by milling to give a desired particle size or obtaining a desired particle size by any other means for producing small particles such as in an air jet mill, where particle bombardment/collision between particles within the preparation function to break the particles apart into smaller particles having a fraction of their original size.

Traditional micronization techniques are based on friction to reduce particle size. Such methods include milling, bashing, and grinding. A typical industrial mill is composed of a cylindrical metallic drum that usually contains steel spheres. As the drum rotates the spheres inside collide with the particles of the solid, thus crushing them towards smaller diameters. In the case of grinding, the solid particles are formed when the grinding units of the device rub against each other while particles of the solid are trapped in between.

Methods like crushing and cutting are also used for reducing particle diameter but produce more rough particles compared to the two previous techniques. Crushing employs hammer-like tools to break the solid into smaller particles by means of impact. Cutting uses sharp blades to cut the rough solid pieces into smaller ones.

Other methods use supercritical fluids in the micronization process to induce a state of supersaturation, which leads to the precipitation of individual particles. Such methods include rapid expansion of supercritical solutions (RESS), supercritical anti-solvent (SAS), and particles from gas saturated solutions (PGSS) methods and can allow for greater tuneability of the process. Parameters like relative pressure and temperature, solute concentration, and antisolvent to solvent ratio are varied to adjust the output. Control of particle size in micronization can be influenced by macroscopic factors, such as geometric parameters of the spray nozzle and flow rate, and molecular level changes due to adjustments in state parameters. These adjustments can lead to the nucleation of particles of varying sizes by redistributing conformational equilibria and polymorphic transformations. The supercritical fluid methods result in finer control over particle diameters, distribution of particle size and consistency of morphology. Because of the relatively low pressure involved, many supercritical fluid methods can incorporate thermolabile materials.

Micronized particles can also be produced by spray-drying.

For example, where the particle is a particle of a compound of Formula 1, such as a compound of Formula 2, the non-micronized form of the particle may have particle size of about 30μ to about 470μ. Therefore, and by way of example, a micronized preparation of particles of the invention can include particles having a size of less than about 30μ. By way of example, such a micronized preparation can comprise a preparation that included 50% or more of the composition by weight of particles comprising a compound of Formula 1 having a substantially reduced particle size compared to a non-micronized preparation. For example, a micronized preparation of particles may include a mixture of micronized particles having a particle size of equal to or below about 20μ, 10μ, 5μ, 4μ, 3μ, 2μ, or even 1μ, including wherein the size of the micronized particle is determined by a laser light methodology.

In some embodiments, the method comprises colliding particles in a composition comprising non-micronized compounds of Formula 1 in an air jet mill in the presence of a grinding gas such as nitrogen gas (e.g., from liquid nitrogen), for a period of time sufficient to provide a composition comprising greater than 50% of a micronized composition, including wherein the micronized composition comprises greater than 50% (such as, in some embodiments, 60%, 70%, 80%, or 90%) of micronized particles having a particle size of less than or equal to about 10μ, or less than or equal to about 5μ. Preferred compositions, formulations or dosage forms include micronized particles, wherein the particle size of 90% of the particles are less than 10μ, preferably less than about 5μ.

The micronized particles of the invention can be evaluated or tested in a conditioning step, wherein a freshly micronized preparation of particles is subjected to a defined set of conditioning parameters. For example, the conditioning parameters may comprise storage of the particles for a 24 hour period under a defined relative humidity (such as 60% RH), and at a defined temperature (such as 25° C.).

Bioavailable can refer to the total amount of a drug substance that is absorbed to be available to provide a desired therapeutic effect after administration of a unit dosage form, as compared to the known reference drug product, as commonly determined and accepted by Governmental Regulatory Agencies, such as the United States FDA. Bioavailability can refer to the extent to which the drug is absorbed from the unit dosage forms and becomes available at the site of drug action.

An exemplary manufacturing process for micronization of an exemplary compound of Formula 1 may be briefly summarized as follows. The equipment utilized for micronization includes a material feeder (e.g., a screw feeder) to provide a controlled feed rate of material to the mill and a jet mill (e.g., micronizer) to reduce the particle size of the drug substance. Non-micronized drug substance is obtained and nitrogen gas (e.g., NF quality) can be used to grind and classify drug powder during the micronization process (e.g., selected as the process gas). Nitrogen may protect the drug substance from oxidation and/or to reduce the ignition potential of airborne powder during processing. Nitrogen gas may be generated from a liquid nitrogen source and regulated to supply the volumetric flow and pressure for micronization.

The micronizer is preferably a spiral jet mill type and uses energy to generate particle-on-particle impact for attrition. Solid particles may be ground and classified to micron sizes in a single pass. High pressure nitrogen can be used as the micronization gas (e.g., processing agent). Nitrogen may maintain an inert environment in the mill during operation and/or may reduce the risk of explosion due to airborne dust accumulation.

Material may be reduced in size by attrition that occurs from high velocity collisions induced by high pressure nitrogen gas (e.g., as grinding gas) that is supplied through jet ports within the mill. During micronization, particles may be fluidized as they travel at high velocity within the mill, and centripetal force may act to classify the particles by their size. Additionally, the fluidized particles may continuously migrate from greater radial distance toward the center of the mill as their size is being reduced. Particles may be reduced to their ultimate size and travel to the central area of the mill where they may be entrained into the collection container(s) by the gas stream. A filter bag integrated with the product collector may enable separation of material from gas flow.

Stabilized micronized particle preparations of the invention include micronized particles with targeted and consistent particle size distribution, suitable and/or improved powder flow characteristics without significant particle agglomeration behavior, substantially or essentially free of undesirable physical transformations as compared to a non-micronized preparation of a compound of Formula 1. Such stabilized micronized particle preparations are characterized by a stable appearance, chemical stability, for example, as measured by HPLC, stable chromatographic purity profile, static water content (e.g., less than about 1.0%, after 12 months stored at 25° C./60% RH) and/or stable distribution of particle size.

Stabilized micronized particles preparations include micronized particles which upon storage generally resist significant particle size growth or particle agglomeration, resist significant formation of impurities and/or degradation products, resist settling within a fluid medium as compared to non-micronized particles, and/or have improved uniformity of suspension and/or dispersion in a medium (such as a fluid medium) as compared to non-micronized particles, including an enhanced uniformity of suspension and/or dispersion in a fluid or viscous medium and/or enhanced homogeneity of suspension and/or dispersion within a fluid medium as compared to non-micronized particles.

Stabilized micronized particle preparations include micronized particles, including those with or without conditioning after micronization, that are relatively resistant to significant particle growth (e.g., agglomeration or particle fusion) in storage, such as after 3 months, 6 months, 9 months, 12 months, or even longer under sealed conditions of storage.

Stabilized micronized particle preparations include micronized particles having chemical and/or physical stability upon preparation (e.g., with or without conditioning) and/or storage, including storage for 1, 3, 6, 9 and/or 12 or more months. Such preparations may preferably comprise particles with a Dv90 particle distribution of ≤10μ or ≤5μ.

Micronized particles may be conditioned. Conditioned micronized particle preparations include micronized particles that have been subjected to particular process conditions after the particles have been micronized. For example, micronized particles may be conditioned by subjecting the particles to a defined set of conditioning parameters, such as a specific relative humidity (e.g., ambient humidity or 43% RH or 60% RH) for a defined period of time (e.g., 24 hours) at a specific temperature (e.g., 25° C. or 60° C.). Storage conditions of stabilized micronized particle preparations include anti-static/desiccant storage.

The compounds of Formula I or II of the present invention by a synthetic process or any processes known in the chemical arts for the production of similar compounds. Processes for the manufacture of a compound of Formula I or II as defined herein are provided in international patent publication WO 2006/113910, which is incorporated herein by reference.

Conventional methods and/or techniques of purification and separation known to those skilled in the art can be used to isolate the compounds of this invention. Such techniques include all types of chromatography (HPLC, column chromatography using common adsorbents such as silica gel, and thin layer chromatography), recrystallization, and differential (i.e., liquid-liquid) extraction techniques.

The compounds herein can form cationic salts such as acid addition salts and the expression "pharmaceutically-acceptable salts" is intended to define but not be limited to such salts as the hydrochloride, hydrobromide, sulfate, hydrogen sulfate, phosphate, hydrogen phosphate, dihydrogenphosphate, acetate, succinate, citrate, benzoate, ascorbate, lactate, pamoate, tartrate, methanesulfonate (mesylate) and p-toluenesulfonate (tosylate) salts. For many compounds polyaddition salts are feasible.

The acid addition salts of the compounds of the present invention are readily prepared by reacting the base forms with the appropriate acid. When the salt is of a monobasic acid (e.g., the hydrochloride, the hydrobromide, the p-toluenesulfonate, the acetate), the hydrogen form of a dibasic acid (e.g., the hydrogen sulfate, the succinate) or the dihydrogen form of a tribasic acid (e.g., the dihydrogen phosphate, the citrate), at least one molar equivalent and usually a molar excess of the acid is employed. However, when such salts as the sulfate, the hemisuccinate, the hydrogen phosphate or the phosphate are desired, the appropriate and exact chemical equivalents of acid will generally be used. The free base and the acid are usually combined in a co-solvent from which the desired salt precipitates, or can be otherwise isolated by concentration and/or addition of a non-solvent.

In certain embodiments, the term "pharmaceutically acceptable salt," as used herein, can refer to a salt prepared from a compound of Formula I or II having an acidic functional group, such as a carboxylic acid functional group, and a pharmaceutically acceptable inorganic or organic base. Suitable bases include, but are not limited to, hydroxides of alkali metals such as sodium, potassium, and lithium; hydroxides of alkaline earth metal such as calcium and magnesium; hydroxides of other metals, such as aluminum and zinc; ammonia, and organic amines, such as unsubstituted or hydroxy-substituted mono-, di-, or trialkylamines; dicyclohexylamine; tributyl amine; pyridine; N-methyl, N-ethylamine; diethylamine; triethylamine; mono-, bis-, or tris-(2-hydroxy-lower alkyl amines), such as mono-, bis-, or tris-(2-hydroxyethyl)-amine, 2-hydroxy-tert-butylamine, or tris-(hydroxymethyl)methylamine, N,N,-di-lower alkyl-N-(hydroxy lower alkyl)-amines, such as N,N-dimethyl-N-(2-hydroxyethyl)-amine, or tri-(2-hydroxyethyl)amine; N-methyl-D-glucamine; and amino acids such as arginine, lysine, and the like.

Polymorph

The invention also provides a polymorphic form of compound 3, which has the structure of:

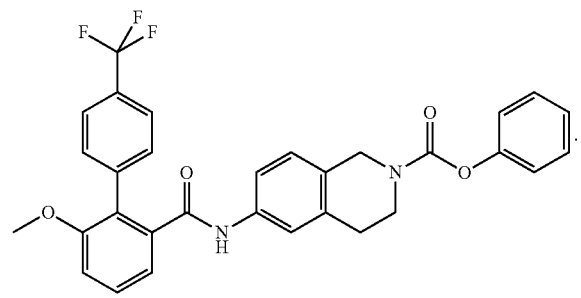

(Compound 3)

In certain embodiments, the invention provides compositions comprising a polymorph of Compound 3 disclosed herein. In certain embodiments, the composition is a pharmaceutical composition comprising at least one polymorph of Compound 3 and a pharmaceutically acceptable carrier or excipient. In certain embodiments, the composition is substantially free of other polymorphs of Compound 3.

Reference to a form of Compound 3 means that at least 50% to 99%, e.g., at least 50%, at least 55%, at least 60%, at least 65%, at least 70%, at least 75%, at least 80%, at least 85%, at least 90%, at least 95%, or at least 99%, of Compound 3 present in a composition is in the designated form.

The crystalline form of Compound 3 was analyzed using x-ray powder diffraction (XRPD). XRPD diffractograms can be obtained using, for example, a Panalytical X'Pert PRO MPD diffractometer using an incident beam of Cu radiation produced using an Optix long, fine-focus source. An elliptically graded multilayer mirror was used to focus Cu Kα x-rays through the specimen and onto the detector.

The data presented herein contain x-ray diffraction patterns with labeled peaks and tables with peak lists. Under most circumstances, peaks within the range of up to about 30° 2θ were selected. Rounding algorithms were used to round each peak to the nearest 0.10 or 0.01° 2θ, depending upon the instrument used to collect the data and/or the inherent peak resolution. The location of the peaks along the x-axis (° 2θ) in both the figures and the tables were determined and rounded to one or two significant figures after the decimal point based upon the above criteria. Peak position variabilities are given to within ±0.2° 2θ based upon recommendations outlined in the United States Pharmacopeia (USP) discussion of variability in x-ray powder diffraction. For d-space listings, the wavelength used to calculate d-spacings was 1.5405929 Å, the Cu-Kα1 wavelength. Variability associated with d-spacing estimates was calculated from the USP recommendation, at each d-spacing, and provided in the respective data tables.

The present invention provides a polymorphic form (Form A), which is characterized by X-ray powder diffraction (XRPD). The characteristic powder diffraction peaks are expressed in degrees 2θ. The relative intensity, as well as the position of intense peaks in FIG. 2 may change or shift under certain conditions, although the crystalline form is the same. One of ordinary skill in the art is able to readily determine whether a given polymorph Form is the same polymorph Form as described in one of FIG. 2 by comparing their peak positions and intensities in the XRPD data.

Figure 2A:
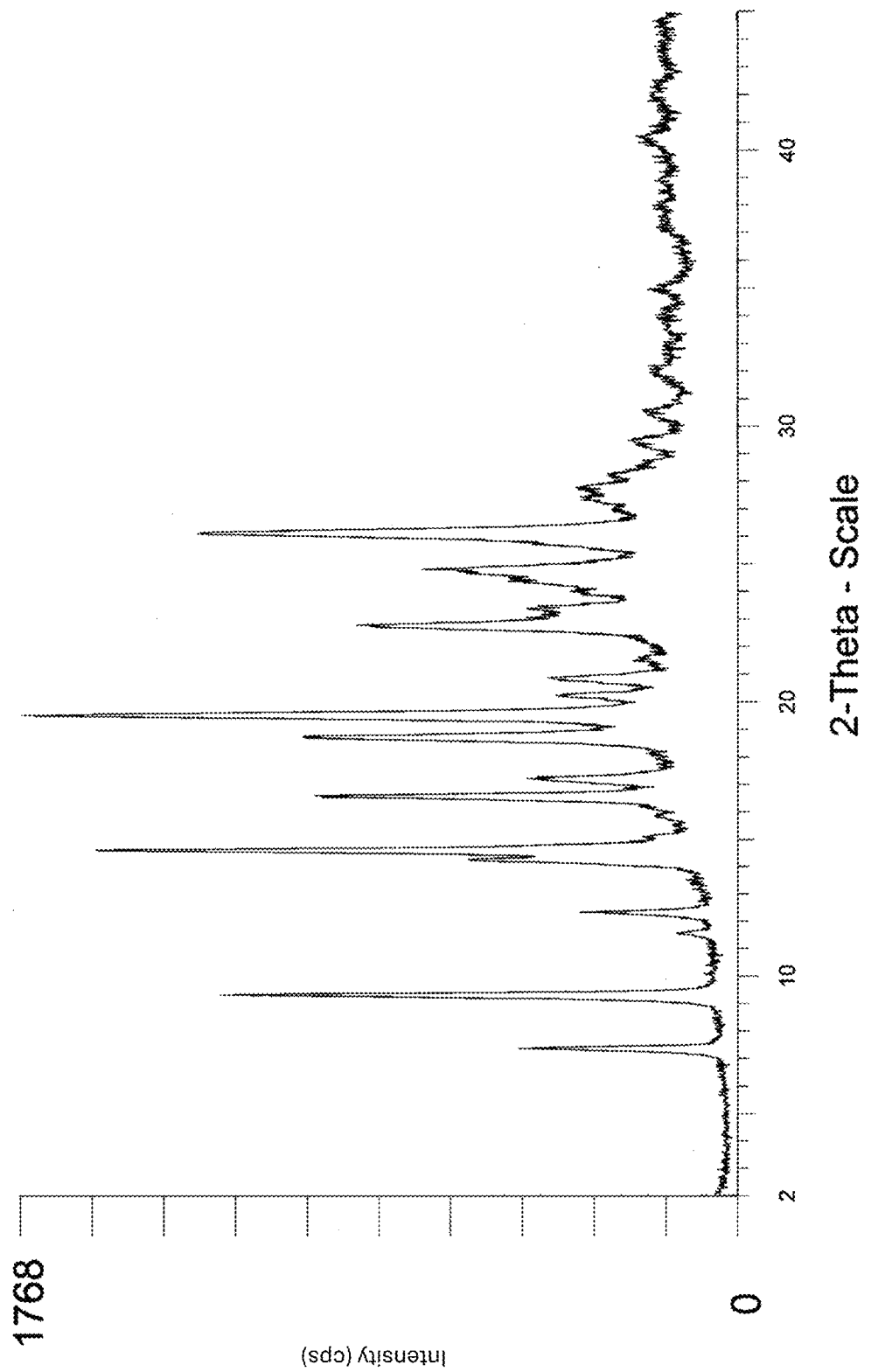
FIG. 2A is the x-ray powder diffraction pattern (XRPD) of a crystalline form of Compound 3.
Figure 2B:
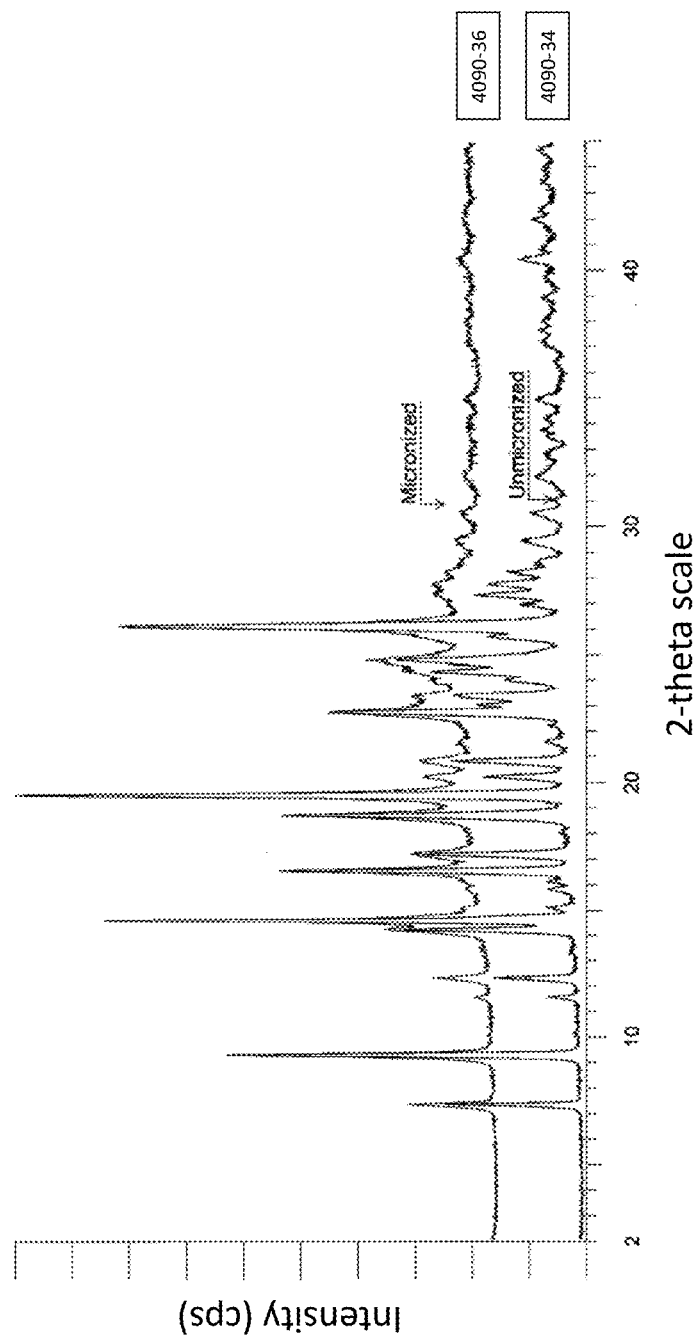
FIG. 2B is an overlap of the x-ray powder diffraction pattern (XRPD) of a crystalline form of micronized and non-micronized Compound 3.
Figure 3A:
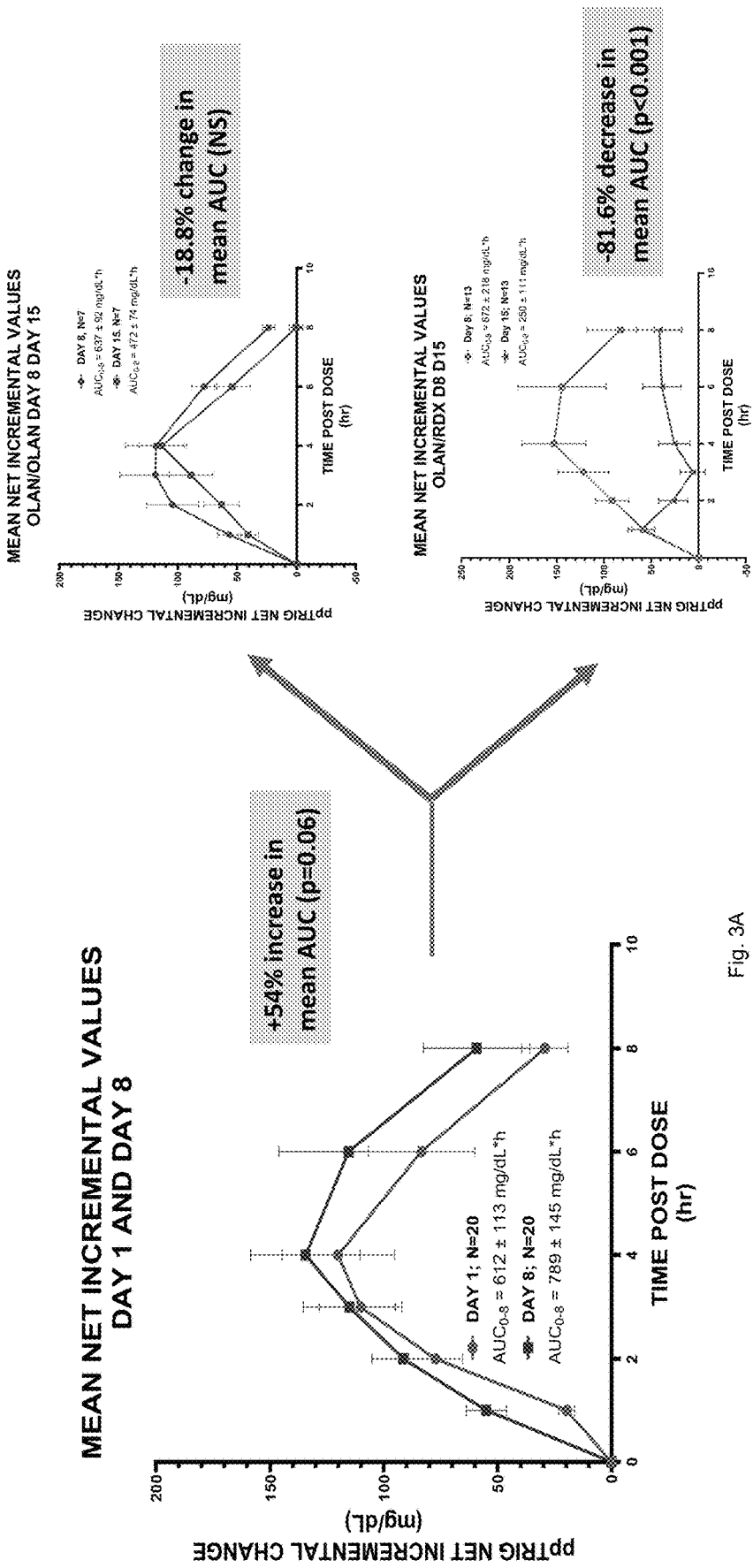
FIG. 3A depicts the net incremental postprandial TG levels on Day 8 vs Day 1/Day 8 vs Day 15.
Figure 3B:
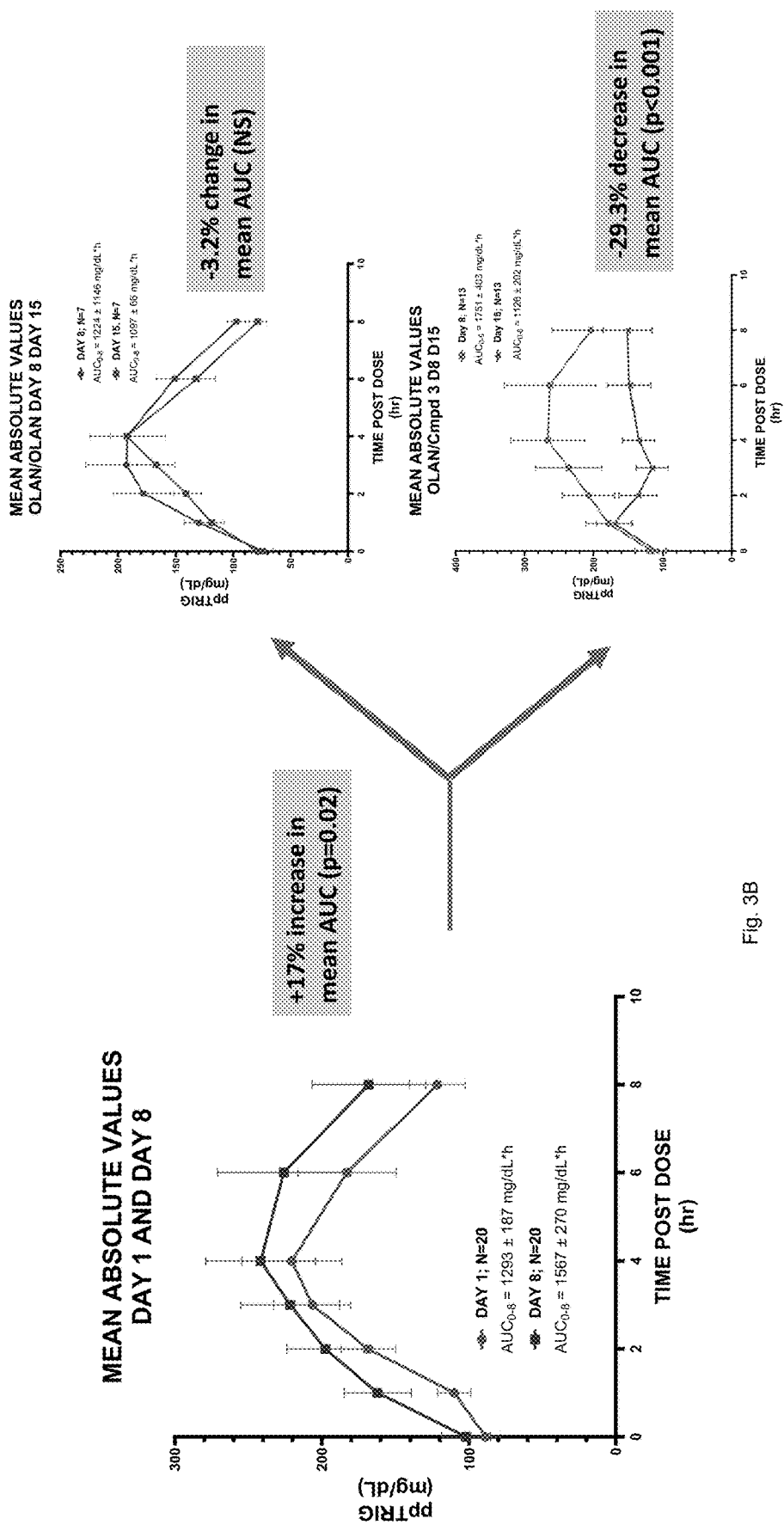
FIG. 3B depicts the absolute postprandial TG levels on Day 8 vs Day 1/Day 8 vs Day 15.
Figure 4:
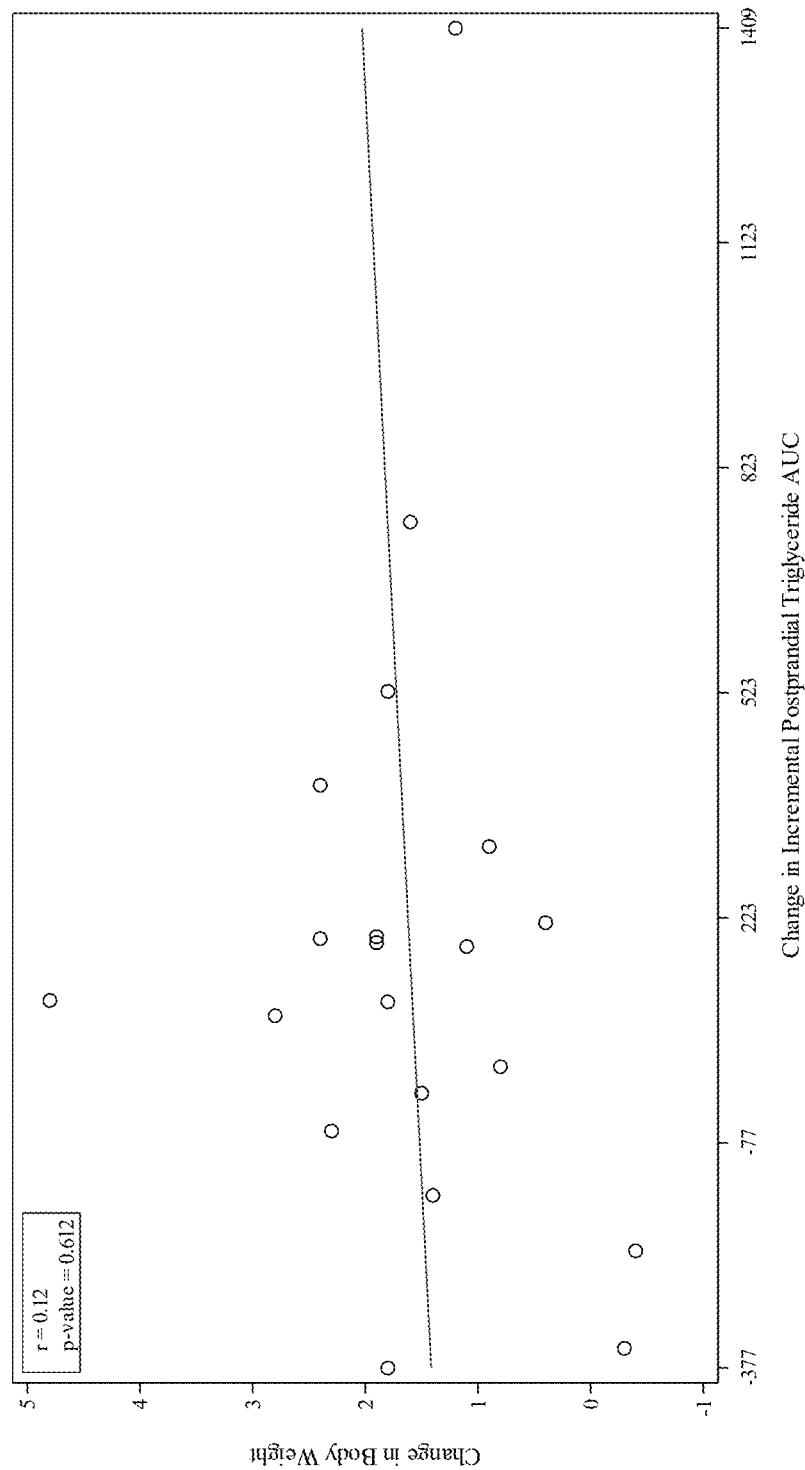
FIG. 4 is a scatter plot depicting the relationship of incremental TG AUC change to body weight change during days 1 to 8 (olanzapine alone).
Figure 5:
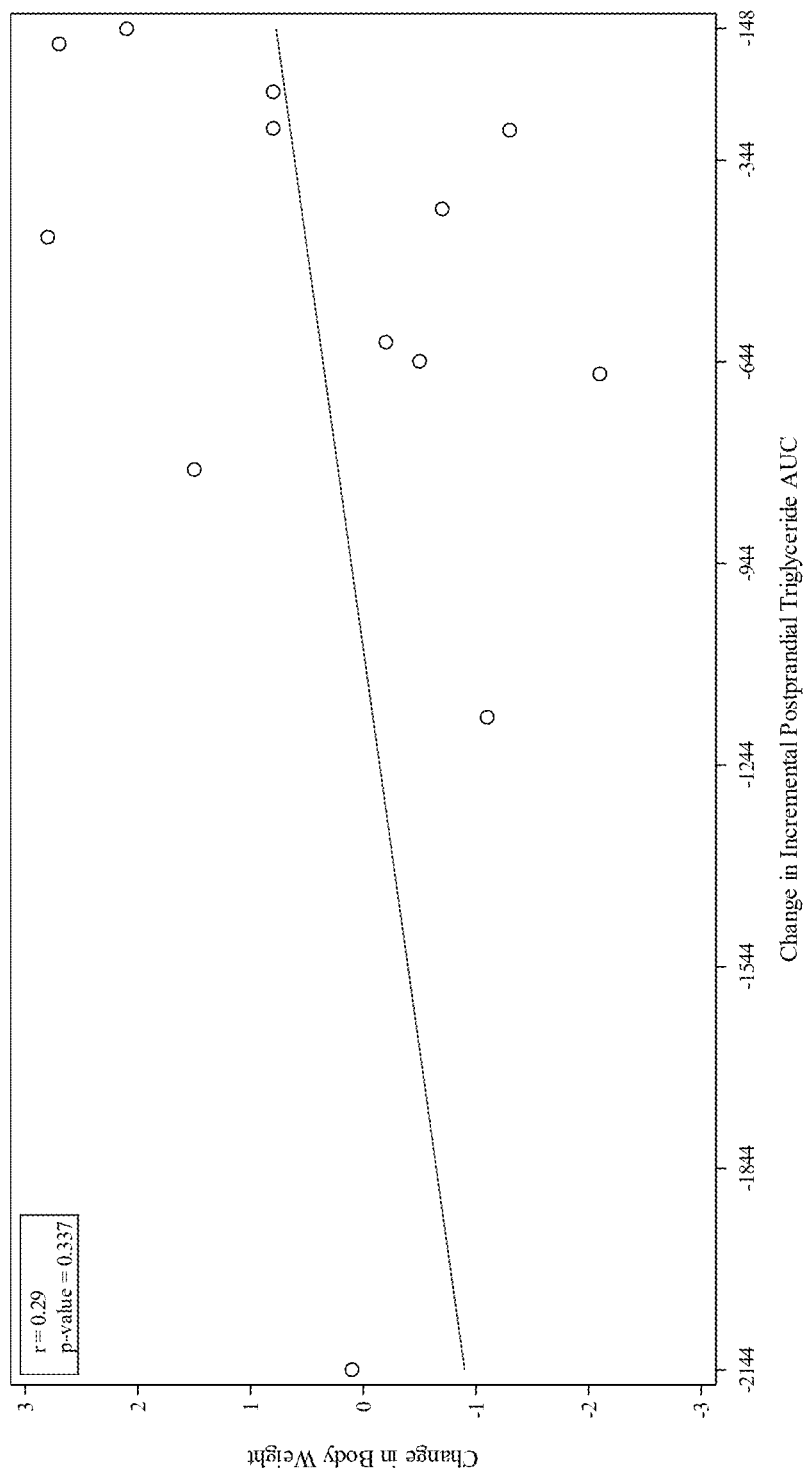
FIG. 5 is a scatter plot depicting the relationship of incremental TG AUC change to body weight change during days 8 to 15 (olanzapine+Compound 3).
Figure 6:
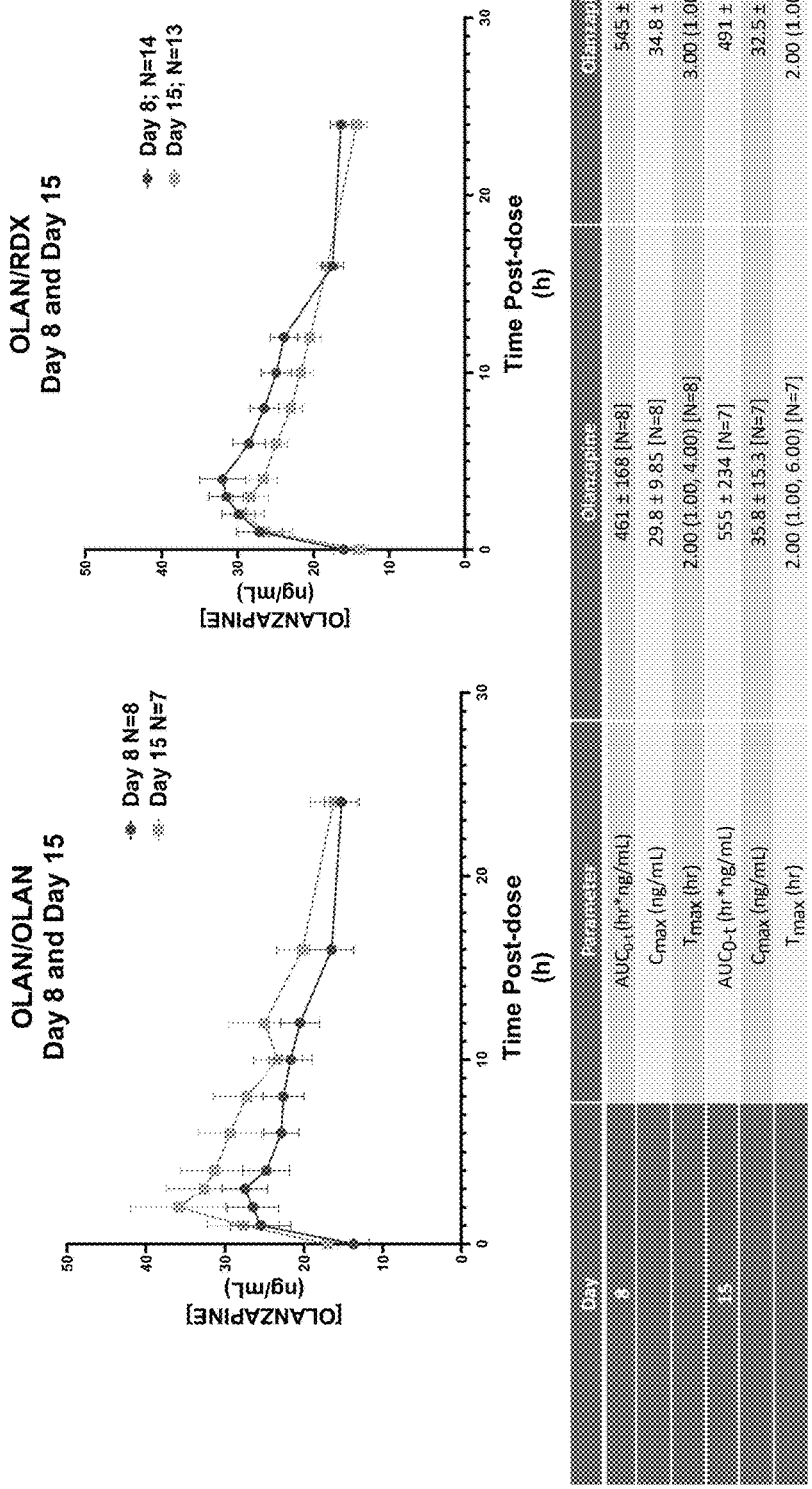
FIG. 6 depicts the effect of Compound 3 on olanzapine pharmacokinetics.

The characteristic peaks (2θ) in the X-ray powder diffraction pattern of crystalline Form A are shown in FIG. 2. Characteristic peaks are at values of two theta (2θ) of about 7, 9, 12, 14, 15, 16.5, 17, 18.5, 19.5, 20.5, 21, 24, and 26. Prominent peaks of Form A are at values of two theta (2θ) of about 9, 15, 16.5, 18.5, 19.5, and 26.

In one embodiment, the crystalline form of Compound 3 disclosed herein is characterized by a XRPD diffractogram having peaks expressed in degrees 2-theta at angles (±0.2 degrees) of 9.267, 14.576, 19.506, and 26.132.

In another embodiment, the crystalline form of Compound 3 is characterized by a PXRD diffractogram having peaks expressed in degrees 2-theta at angles (±0.2 degrees) of 16.555, 18.708, and 22.754.

In another embodiment, the crystalline form of Compound 3 is characterized by a XRPD diffractogram having peaks expressed in degrees 2-theta at angles (±0.2 degrees) of 9.267, 14.576, 18.708, 19.506, 22.754, and 26.132.

In another embodiment, the crystalline form of Compound 3 is characterized by a XRPD diffractogram having peaks expressed in degrees 2-theta at angles (±0.2 degrees) of 7.318, 9.267, 14.206, 14.576, 18.708, 19.506, 22.754, 24.795, and 26.132.

In another embodiment, the crystalline form of Compound 3 has a XRPD diffractogram substantially as depicted in FIG. 2A. In one embodiment, the crystalline form of Compound 3 is characterized by a XRPD diffractogram having peaks expressed in degrees 2-theta at angles (0.2 degrees) as shown in FIG. 2A.

In one embodiment, the crystalline form of Compound 3 is characterized by any two, three, four, five, six, seven, or eight peaks as shown in Table 1. In another embodiment, the crystalline form of Compound 3 is characterized by a XRPD diffractogram having peaks expressed in degrees 2-theta at angles (±0.2 degrees) as shown in Table 1.

In embodiments, the crystalline form of Compound 3 is substantially pure. As used herein, the term "substantially pure," when used in reference to a given crystalline form, refers to the crystalline form which is at least about 75% pure. This means that the crystalline form does not contain more than about 25% of any other form of Compound 3. Preferably, the term "substantially pure" refers to a crystalline form of Compound 3 which is at least about 90% pure. This means that the crystalline form does not contain more than about 10% of any other form of Compound 3. Preferably, the term "substantially pure" refers to a crystalline form of Compound 3 which is at least about 95% pure. This means that the crystalline form of Compound 3 does not contain more than about 5% of any other form of Compound 3. More preferably, the term "substantially pure" refers to a crystalline form of Compound 3 which is at least about 97% pure. This means that the crystalline form of Compound 3 does not contain more than about 3% of any other form of Compound 3. More preferably, the term "substantially pure" refers to a crystalline form of Compound 3 which is at least about 99% pure. This means that the crystalline form of Compound 3 does not contain more than about 1% of any other form of Compound 3.

Methods and Uses

The compositions comprising particles comprising compounds described herein can be used for treating a variety of diseases or conditions in a mammal or a human, is provided in accordance with the present invention. Preferably, the method comprises administering to a subject (e.g., a mammal, including a human) in need of treatment an effective amount of a pharmaceutical composition comprising an effective amount of particles comprising one or more compounds described herein, such that the disease or condition is treated.

In embodiments, the invention provides a method of inhibiting microsomal triglyceride transfer protein in a subject comprising orally administering a pharmaceutical composition comprising particles comprising a compound of Formula 1 as described herein.

In embodiments, the invention provides a method of treating loss of intestinal homeostasis, such as dyslipidemia, hyperlipidemia, metabolic syndrome, or a lipid-related metabolic disorder, in a subject comprising orally administering a pharmaceutical composition comprising particles comprising a compound of Formula 1 as described herein.

In embodiments, the invention provides a method of treating a subject comprising orally administering a pharmaceutical composition comprising particles comprising a compound of Formula 1 as described herein, wherein an inhibition of absorption, assembly, and/or transport of lipids, cholesterol, and/or microbial metabolites in the GI tract of the subject.

In embodiments, the invention provides a method of treating a disorder in a subject comprising orally administering a pharmaceutical composition comprising particles comprising a compound of Formula 1 as described herein, wherein the disorder is GI tract disorder. Preferably, the gastrointestinal (GI) tract disorder is a metabolic disease, a GI tract mucosal inflammation, or a GI inflammatory disease.

The term "inflammatory disease" refers to a disease caused by, resulting from, or resulting in inflammation. The term "inflammatory disease" may also refer to a dysregulated inflammatory reaction that causes an exaggerated response by macrophages, granulocytes, and/or T-lymphocytes leading to abnormal tissue damage and/or cell death. An inflammatory disease can be either an acute or chronic inflammatory condition and can result from infections or non-infectious causes. Inflammatory diseases include, without limitation, atherosclerosis, arteriosclerosis, autoimmune disorders, multiple sclerosis, systemic lupus erythematosus, polymyalgia rheumatica (PMR), gouty arthritis, degenerative arthritis, tendonitis, bursitis, psoriasis, cystic fibrosis, arthrosteitis, rheumatoid arthritis, inflammatory arthritis, Sjogren's syndrome, giant cell arteritis, progressive systemic sclerosis (scleroderma), ankylosing spondylitis, polymyositis, dermatomyositis, pemphigus, pemphigoid, diabetes (e.g., Type I), myasthenia gravis, Hashimoto's thyroiditis, Graves' disease, Goodpasture's disease, mixed connective tissue disease, sclerosing cholangitis, inflammatory bowel disease, Crohn's disease, ulcerative colitis, pernicious anemia, inflammatory dermatoses, usual interstitial pneumonitis (UIP), asbestosis, silicosis, bronchiectasis, berylliosis, talcosis, pneumoconiosis, sarcoidosis, desquamative interstitial pneumonia, lymphoid interstitial pneumonia, giant cell interstitial pneumonia, cellular interstitial pneumonia, extrinsic allergic alveolitis, Wegener's granulomatosis and related forms of angiitis (temporal arteritis and polyarteritis nodosa), inflammatory dermatoses, hepatitis, delayed-type hypersensitivity reactions (e.g., poison ivy dermatitis), pneumonia, respiratory tract inflammation, Adult Respiratory Distress Syndrome (ARDS), encephalitis, immediate hypersensitivity reactions, asthma, hayfever, allergies, acute anaphylaxis, rheumatic fever, glomerulonephritis, pyelonephritis, cellulitis, cystitis, chronic cholecystitis, ischemia (ischemic injury), reperfusion injury, allograft rejection, host-versus-graft rejection, appendicitis, arteritis, blepharitis, bronchiolitis, bronchitis, cervicitis, cholangitis, chorioamnionitis, conjunctivitis, dacryoadenitis, dermatomyositis, endocarditis, endometritis, enteritis, enterocolitis, epicondylitis, epididymitis, fasciitis, fibrositis, gastritis, gastroenteritis, gingivitis, ileitis, iritis, laryngitis, myelitis, myocarditis, nephritis, omphalitis, oophoritis, orchitis, osteitis, otitis, pancreatitis, parotitis, pericarditis, pharyngitis, pleuritis, phlebitis, pneumonitis, proctitis, prostatitis, rhinitis, salpingitis, sinusitis, stomatitis, synovitis, testitis, tonsillitis, urethritis, urocystitis, uveitis, vaginitis, vasculitis, vulvitis, vulvovaginitis, angitis, chronic bronchitis, osteomyelitis, optic neuritis, temporal arteritis, transverse myelitis, necrotizing fasciitis, and necrotizing enterocolitis. An ocular inflammatory disease includes, but is not limited to, post-surgical inflammation. Inflammatory disease also includes postprandial inflammation, which is inflammation following the prolonged elevation of triglycerides occurring subsequent to ingestion of high-fat meals. Preferably, the inflammatory disease is ulcerative colitis, inflammatory bowel disease, or Crohn's disease.

The term "metabolic disease" refers to any disorder that involves an alteration in the normal metabolism of carbohydrates, lipids, proteins, nucleic acids, or a combination thereof. A metabolic disease is associated with either a deficiency or excess in a metabolic pathway resulting in an imbalance in metabolism of nucleic acids, proteins, lipids, and/or carbohydrates. Factors affecting metabolism include, and are not limited to, the endocrine (hormonal) control system (e.g., the insulin pathway, the enteroendocrine hormones including GLP-1, PYY or the like), the neural control system (e.g., GLP-1 in the brain), or the like. Examples of metabolic diseases include, but are not limited to, diabetes (e.g., Type I diabetes, Type II diabetes, gestational diabetes), hyperglycemia, dyslipidemia, hyperlipidemia, metabolic syndrome, lipid-related metabolic disorder, hyperinsulinemia, insulin resistance, and obesity. Preferably, the metabolic disease is hypertriglyceridemia, mixed dyslipidemia, atherosclerosis, obesity, or diabetes.

In embodiments, the invention provides a method of reducing antipsychotic induced weight gain comprising administering to the patient in need of treatment an effective amount of a pharmaceutical composition comprising particles comprising a compound of Formula 1 as described herein. Preferably, the atypical antipsychotic is selected from the group consisting of olanzapine, clozapine, risperidone, quetiapine, aripiprazole, ziprasidone, and pharmaceutically acceptable salts thereof. Preferably, the atypical antipsychotic is olanzapine or pharmaceutically acceptable salts thereof. Preferably, the atypical antipsychotic is clozapine or pharmaceutically acceptable salts thereof. Preferably, the atypical antipsychotic is risperidone or pharmaceutically acceptable salts thereof. Preferably, the atypical antipsychotic is quetiapine or pharmaceutically acceptable salts thereof. Preferably, the atypical antipsychotic is aripiprazole or pharmaceutically acceptable salts thereof. Preferably, the atypical antipsychotic is ziprasidone or pharmaceutically acceptable salts thereof.

Preferably, the atypical antipsychotic is used in the treatment of schizophrenia, bipolar disorder, dementia, acute mania, major depression and psychotic agitation. Preferably, the atypical antipsychotic is used in the treatment of schizophrenia. Preferably, the atypical antipsychotic is used in the treatment of bipolar disorder. Preferably the bipolar disorder is a bipolar I disorder with a single manic episode. Preferably, the bipolar disorder is a bipolar I disorder manifesting a mixed most recent episode. Preferably, the bipolar disorder is a bipolar II disorder. Preferably, the atypical antipsychotic is used in the treatment of dementia. Preferably, the atypical antipsychotic is used in the treatment of acute mania. Preferably, the atypical antipsychotic is used in the treatment of major depression. Preferably, the atypical antipsychotic is used in the treatment of psychotic agitation.

In embodiments, the invention provides a method of treating a disease or disorder selected from schizophrenia, bipolar disorder, acute mania, bipolar I disorder with a single manic episode, bipolar I disorder manifesting a mixed most recent episode, or bipolar II disorder comprising administering a composition comprising an atypical antipsychotic as described herein and a pharmaceutical composition comprising particles comprising a compound of Formula 1 as described herein. Preferably, the method further comprises the mitigation of weight gain associated with the atypical antipsychotic treatment.

Preferably, for any of the method described herein, the compound has less than 10% oral bioavailability, preferably less than 3% and more preferably less than 1% oral bioavailability. Preferably, for any of the method described herein, the compound is not substantially systemically absorbed.

Preferably, for any of the method described herein, the particles comprise a therapeutically effective amount of compound.

Preferably, for any of the method described herein, the composition is administered within 60 minutes, preferably within 30 minutes of a meal.

Preferably, for any of the method described herein, the subject has a history of acute heart failure, atrial fibrillation, hypoalbuminemia, or high inflammatory activity.

Preferably, for any of the method described herein, serum triglycerides are reduced in the subject.

Preferably, for any of the method described herein, the volume particle fraction comprises a therapeutically effective amount of the compound. Preferably, the volume particle fraction comprises less than 100 mg compound, preferably less than 50 mg, preferably less than 30 mg per unit dose.

Preferably, for any of the method described herein, the composition comprises less than 500 mg compound, preferably less than 300 mg, preferably less than 250 mg per unit dose. Preferably, the composition comprises 400 mg per unit dose. Preferably, the composition comprises 200 mg per unit dose.

Preferably, the pharmaceutical composition of the invention is suitable for the treatment of diseases or conditions including, but not limited to, hypertriglyceridemia, atherosclerosis, pancreatitis, obesity, hypercholesterolemia, hyperchylomicronemia, hyperlipidemia, and diabetes, and related conditions.

In certain embodiments, the compound is administered in an amount sufficient to decrease the secretion of apolipoprotein B. The present invention also provides for a method of decreasing apo B secretion in a mammal or human, comprising administering to a mammal or a human of a compound of Formula I or II, or a pharmaceutical composition comprising a compound of Formula I or II, in an amount sufficient to decrease the levels or amount of secretion of apo B.

The compounds of this invention inhibit or decrease apo B secretion, likely by the inhibition of MTP, although it may be possible that other mechanisms are involved as well. The compounds are useful in any of the diseases or conditions in which apo B, serum cholesterol, and/or triglyceride levels are elevated. Accordingly, the invention further provides a method of treating a condition selected from hypertriglyceridemia, atherosclerosis, pancreatitis, obesity, hypercholesteremia, hyperchylomicronemia, hyperlipidemia, and diabetes, comprising administering to a mammal, especially a human, in need of such treatment an amount of a compound of Formula I or II as defined above sufficient to decrease the secretion of apolipoprotein B.

The term "treating" as used herein includes preventative as well as disease remitative treatment.

The invention further provides a method of decreasing apo B secretion in a mammal, especially a human, comprising administering to said mammal an apo B-(secretion) decreasing amount of a compound of Formula I or II as defined above.

The invention also provides kits for treatment or prevention of diseases or conditions in which apo B, serum cholesterol, and/or triglyceride levels are elevated. Accordingly, the invention further provides kits for treatment or prevention of a condition selected from hypertriglyceridemia, atherosclerosis, pancreatitis, obesity, hypercholesteremia, hyperchylomicronemia, hyperlipidemia, and diabetes. In one embodiment, the kit includes an effective amount of a compound of this invention (e.g., a compound of Formula I or Formula II) in unit dosage form, together with instructions for administering the compound to a subject suffering from or susceptible to diseases or conditions in which apo B, serum cholesterol, and/or triglyceride levels are elevated (including without limitation hypertriglyceridemia, atherosclerosis, pancreatitis, obesity, hypercholesteremia, hyperchylomicronemia, hyperlipidemia, and diabetes), preferably wherein the effective amount of compound is less than 1000 mg (more preferably less than 500 mg) of the compound.

In preferred embodiments, the kit comprises a sterile container which contains the compound; such containers can be boxes, ampules, bottles, vials, tubes, bags, pouches, blister-packs, or other suitable container form known in the art. Such containers can be made of plastic, glass, laminated paper, metal foil, or other materials suitable for holding medicaments.

The instructions will generally include information about the use of the compound for treatment or prevention of diseases or conditions in which apo B, serum cholesterol, and/or triglyceride levels are elevated (including without limitation hypertriglyceridemia, atherosclerosis, pancreatitis, obesity, hypercholesteremia, hyperchylomicronemia, hyperlipidemia, and diabetes); in preferred embodiments, the instructions include at least one of the following: description of the compound; dosage schedule and administration for treatment of diseases or conditions in which apo B, serum cholesterol, and/or triglyceride levels are elevated; precautions; warnings; indications; counter-indications; overdosage information; adverse reactions; animal pharmacology; clinical studies; and/or references. The instructions may be printed directly on the container (when present), or as a label applied to the container, or as a separate sheet, pamphlet, card, or folder supplied in or with the container.

The present invention is illustrated by the following Examples. However, it should be understood that the invention is not limited to the specific details of these examples.

EXAMPLES

Crystalline Form

The crystalline form of Compound 3 was made according to the following method: a solution of Compound 3 (1 equiv.) in ethyl acetate (5 volumes) was heated to 75° C. (±5° C.) and stirred for 10-15 minutes. The resulting clear solution was cooled to 30° C. (±5° C.) and heptane (8.5 volumes) was slowly added over 30 minutes at 30° C. (±5° C.). The solution was stirred at this temperature for 2 hours. The solid product was collected and washed with heptane (3 volumes). The solid product was then dried to constant weight under vacuum at 50° C. (±5° C.).

An X-ray powder diffraction pattern was obtained on a on a Bruker D8 Advance diffractometer. Analysis was performed from 2-45° 2-theta using the V20 slit setting, step size 0.02° and step time of 5 seconds.

The relative intensity of each diffractogram peak in Table 1 as well as FIG. 2 may change or shift under certain conditions, although the crystalline form is the same. One of ordinary skill in the art should be able to readily determine whether a given crystalline form is the same crystalline form as described in FIG. 2 or Table 1.

TABLE 1

| Peak Number | Angle (2-Theta °) |
| --- | --- |
| 1 | 7.318 |
| 2 | 9.267 |
| 3 | 11.538 |
| 4 | 12.291 |
| 5 | 14.206 |
| 6 | 14.576 |
| 7 | 15.048 |
| 8 | 15.841 |
| 9 | 16.120 |
| 10 | 16.555 |
| 11 | 17.187 |
| 12 | 18.708 |
| 13 | 19.506 |
| 14 | 20.216 |
| 15 | 20.828 |
| 16 | 22.754 |
| 17 | 23.375 |
| 18 | 23.946 |
| 19 | 24.410 |
| 20 | 24.795 |
| 21 | 26.132 |
| 22 | 27.000 |
| 23 | 27.388 |
| 24 | 27.783 |

TABLE 1-continued

| Peak Number | Angle (2-Theta °) |
| --- | --- |
| 25 | 28.219 |
| 26 | 28.618 |
| 27 | 29.477 |
| 28 | 30.558 |
| 29 | 31.940 |
| 30 | 34.931 |
| 31 | 40.481 |

Micronization

Micronization was performed using a Fluid Energy 00 Jet-O-Mizer with nitrogen (N2) as the carrier gas at venturi and mill pressures of 80/80 psi, respectively, and a feed rate of about 190 g/h.

A Randomized, Open-Label Study of the Effect of Compound 3 on Postprandial Triglycerides in Subjects Treated with the Atypical Antipsychotic Drug, Olanzapine A single-center, randomized, open-label, parallel design, single dose, multi-day study was undertaken with 2 cohorts of 24 healthy adults between the ages of 18-55 to assess the efficacy of treatment with 200 mg of Compound 3, twice daily (BID), on postprandial triglyceride levels and apolipoprotein B48 (ApoB48) levels in normal healthy volunteers treated with 10 mg olanzapine. The effect of Compound 3 on the steady-state pharmacokinetics (PK) of olanzapine and the short-term effects of olanzapine and olanzapine with RDX-002 on fasting lipids was also assessed. Both total/Absolute area under the curve (AUC) and incremental AUC were utilized in the study to calculate AUC.

In the study, patients were given 10 mg of olanzapine alone for 7 days (days 2-8; day 1 was used as a baseline with no pharmacological treatment) and then were given either 10 mg of olanzapine alone or 10 mg of olanzapine+200 mg of Compound 3 BID for the next 7 days (days 8-15). 24 subjects entered the study and there were 4 withdrawals, which were non-study related.

Postprandial triglycerides and lipid profiles were assessed on study days 1, 8, and 15, olanzapine pharmacokinetics was assessed on study days 8 and 15, and safety and tolerability were assessed throughout. On each of these study days, subjects consumed a standardized breakfast (~900 kcal; 55% of kcal from fat) in 15 minutes. Blood samples were drawn prior to meal consumption and 1, 2, 3, 4, 6 and 8 hours after initiation of meal.

Treatment with olanzapine alone increased postprandial triglycerides; however, treatment with Compound 3 greatly reduced postprandial triglycerides in the olanzapine-treated subjects. Consistent with prior studies, treatment with olanzapine resulted in significant weight gain during the first week of treatment. Treatment with Compound 3 resulted in a significant blunting in body weight gain from olanzapine in the second week of the study (1.7 kg; 2.2% vs 0.4 kg; 0.5%). Preliminary analyses indicate an association between changes in incremental postprandial TG levels and body weight changes, potentially further strengthening the strong role for MTP and MTP-inhibition. Treatment with olanzapine also appeared to significantly increase LDL-C from Day 9-15, which was blunted by Compound 3. These effects were also mirrored in total cholesterol and non-HDL-C levels. Compound 3 did not significantly impact the pharmacokinetic profile of olanzapine. No changes in glucose were observed. Results are shown in FIG. 3-FIG. 6.

No SAEs, fatal events, or discontinuations due to adverse events were observed in the study. Treatment with olanzapine resulted in expected CNS side effects (somnolence, dizziness etc.) as well as a few cases of LFT elevations. Treatment with Compound 3 produced expected mostly mild/moderate GI side effects associated with MTP-I.

While this invention has been particularly shown and described with references to preferred embodiments thereof, it will be understood by those skilled in the art that various changes in form and details may be made therein without departing from the scope of the invention encompassed by the appended claims.

| | Gender M/F | Age (yrs) ± STD | Height (in) ± STD | Weight (lbs) ± STD | BMI (kg/m$^2$) ± STD | Fasting TG (mg/dL) ± STD |
| --- | --- | --- | --- | --- | --- | --- |
| Overall (N = 24) | 21/3 | 28.1 ± 7.5 | 68.7 ± 3.9 | 167.7 ± 22.2 | 24.9 ± 2.3 | 91.2 ± 44.8 |
| OLAN followed by OALN (N = 8) | 6/2 | 33.5 ± 6.4 | 68.8 ± 4.4 | 171.5 ± 24.5 | 25.4 ± 1.9 | 75.9 ± 14.8 |
| OLAN followed by RDX-002 (N = 16) | 15/1 | 25.4 ± 6.7 | 68.7 ± 3.7 | 165.8 ± 21.8 | 24.7 ± 2.4 | 99.5 ± 52.7 |
| Inclusion Criteria | | | Normal, healthy volunteers Aged 18-50 years BMI 18-27.5 kg/m2 Antipsychotic naïve No diabetes No clinical meaningful dyslipidemia | | | |

What is claimed:

1. A composition comprising particles comprising a compound having the structure:

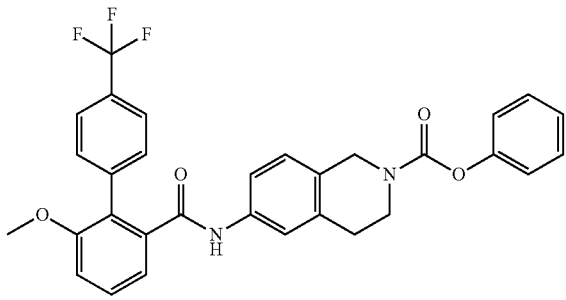 [SMILES: COc1cccc(C(=O)Nc2ccc3c(c2)CCN(C(=O)Oc2ccccc2)C3)c1-c1ccc(C(F)(F)F)cc1]

or a pharmaceutically acceptable salt thereof;
wherein the compound is in crystalline form characterized by an x-ray powder diffraction (XRPD) diffractogram comprising characteristic peaks (°2θ) at angles of 9.267±0.2 (°2θ), 14.576±0.2 (°2θ), 19.506±0.2 (°2θ), and 26.132±0.2 (°2θ); and
wherein at least 50% of the particles are characterized by a volume particle fraction less than 10 μm.

2. The composition according to claim 1, wherein at least 90% of the particles are characterized by a volume particle fraction less than 10 μm.

3. The composition according to claim 1, wherein the XRPD diffractogram further comprises characteristic peaks (°2θ) at angles of 16.555±0.2 (°2θ), 18.708±0.2 (°2θ), and 22.54±0.2 (°2θ).

4. The composition according to claim 1, wherein the compound is in crystalline form characterized by an x-ray powder diffraction pattern of FIG. 2A.

5. The composition according to claim 1, wherein the median particle diameter is less than 10 μm.

6. The composition according to claim 1, wherein at least 50% of the particles are characterized by a volume particle fraction less than 5 μm.

7. The composition according to claim 1, wherein at least 50% of the particles are characterized by a volume particle fraction less than 2.5 μm.

8. The composition according to claim 1, wherein the particles have a $DV_{90}$ particle size distribution of 2 μm to 6 μm, a $DV_{50}$ particle size distribution of 2.5 μm to 1 μm, and a $DV_{10}$ particle size distribution of 0.1 μm to 1 μm.

9. The composition according to claim 1, wherein the particles have a $DV_{90}$ particle size distribution of 2 μm to 5 μm; a $DV_{50}$ particle size distribution of 2.5 μm to 1 μm; and a $DV_{10}$ particle size distribution of 0.1 μm to 1 μm.

10. The composition according to claim 1, wherein the particles have a $DV_{90}$ particle size distribution of 2 μm to 4.5 μm; a $DV_{50}$ particle size distribution of 2.5 μm to 1 μm; and a $DV_{10}$ particle size distribution of 0.1 μm to 1 μm.

11. The composition according to claim 1, wherein the particles have a $DV_{90}$ particle size distribution of 2 μm to 4.5 μm; a $DV_{50}$ particle size distribution of 2 μm to 1 μm; and a $DV_{10}$ particle size distribution of 0.1 μm to 1 μm.

12. The composition according to claim 5, wherein the median particle diameter is less than 5 μm.

13. The composition according to claim 5, wherein the median particle diameter is less than 4 μm.

14. The composition according to claim 5, wherein the median particle diameter is less than 2.5 μm.

15. The composition according to claim 1, wherein the particles are ground, spray-dried, milled, or micronized.

16. The composition according to claim 15, wherein the particles are micronized.

17. The composition according to claim 1, wherein the composition is formulated into a unit dosage form for oral delivery.

18. The composition according to claim 1, wherein the composition is formulated into a tablet or a capsule.

* * * * *